(12) United States Patent
Suyama et al.

(10) Patent No.: US 12,116,085 B1
(45) Date of Patent: Oct. 15, 2024

(54) COMPONENT FOR HUMAN-POWERED VEHICLE

(71) Applicant: Shimano Inc., Osaka (JP)

(72) Inventors: Shota Suyama, Osaka (JP); Satoshi Fujii, Osaka (JP); Takeshi Ueda, Osaka (JP); Toshiaki Moriya, Osaka (JP); Kei Matsumoto, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 18/382,087

(22) Filed: Oct. 20, 2023

(51) Int. Cl.
*B62M 9/122* (2010.01)
*B60L 53/80* (2019.01)
*B62J 43/30* (2020.01)

(52) U.S. Cl.
CPC ............ *B62M 9/122* (2013.01); *B60L 53/80* (2019.02); *B62J 43/30* (2020.02)

(58) Field of Classification Search
CPC .......... B62M 9/122; B62M 6/70; B62J 43/30; B60L 53/80
USPC .............................................. 701/51; 429/98
See application file for complete search history.

(56) References Cited

U.S. PATENT DOCUMENTS

| | | | | |
|---|---|---|---|---|
| 4,435,486 A | * | 3/1984 | Pomaro ..................... | B60K 1/04 429/1 |
| 9,676,444 B2 | | 6/2017 | Shipman et al. | |
| 9,890,838 B2 | | 2/2018 | Shipman et al. | |
| 10,930,903 B2 | * | 2/2021 | Mitsuyasu ............... | B62M 6/90 |
| 12,010,805 B2 | * | 6/2024 | Mayberry ........... | H01M 50/576 |
| 2011/0240391 A1 | * | 10/2011 | Bonneville ............. | B60L 50/52 180/220 |
| 2012/0326665 A1 | * | 12/2012 | Yin ........................ | B60L 53/302 429/100 |
| 2015/0114736 A1 | * | 4/2015 | Avganim .................. | B60K 1/04 180/68.5 |
| 2016/0107517 A1 | * | 4/2016 | Larray ..................... | B60K 1/04 180/220 |
| 2017/0297652 A1 | * | 10/2017 | Yoshiie ............... | H01M 50/249 |
| 2019/0372182 A1 | * | 12/2019 | Takayasu ................ | B60L 50/64 |
| 2022/0048402 A1 | * | 2/2022 | Desberg ................. | B62K 3/002 |
| 2022/0285781 A1 | * | 9/2022 | Renfro ................ | H01M 50/264 |
| 2023/0093851 A1 | | 3/2023 | De Poli | |
| 2023/0101681 A1 | | 3/2023 | Minto | |

* cited by examiner

*Primary Examiner* — Colby M Hansen
(74) *Attorney, Agent, or Firm* — Global IP Counselors, LLP

(57) ABSTRACT

A component for a human-powered vehicle basically comprises a power source connecting portion, an actuator and a first electronic controller circuitry. The power source connecting portion is connected to a power source. The power source connecting portion includes an attachment surface, a first terminal and a first detection terminal. The actuator is electrically connected to the power source connecting portion. The first electronic controller circuitry controls the actuator with supply current provided from the power source. The first terminal is electrically connected to a power supply terminal of the power source. The first terminal supplies the supply current to the actuator in a state where the first detection terminal is electrically connected to a second detection terminal of the power source. The first detection terminal contacts to the second detection terminal after the first terminal contacts to the power supply terminal during connecting operation of the power source to the power source connecting portion.

20 Claims, 21 Drawing Sheets

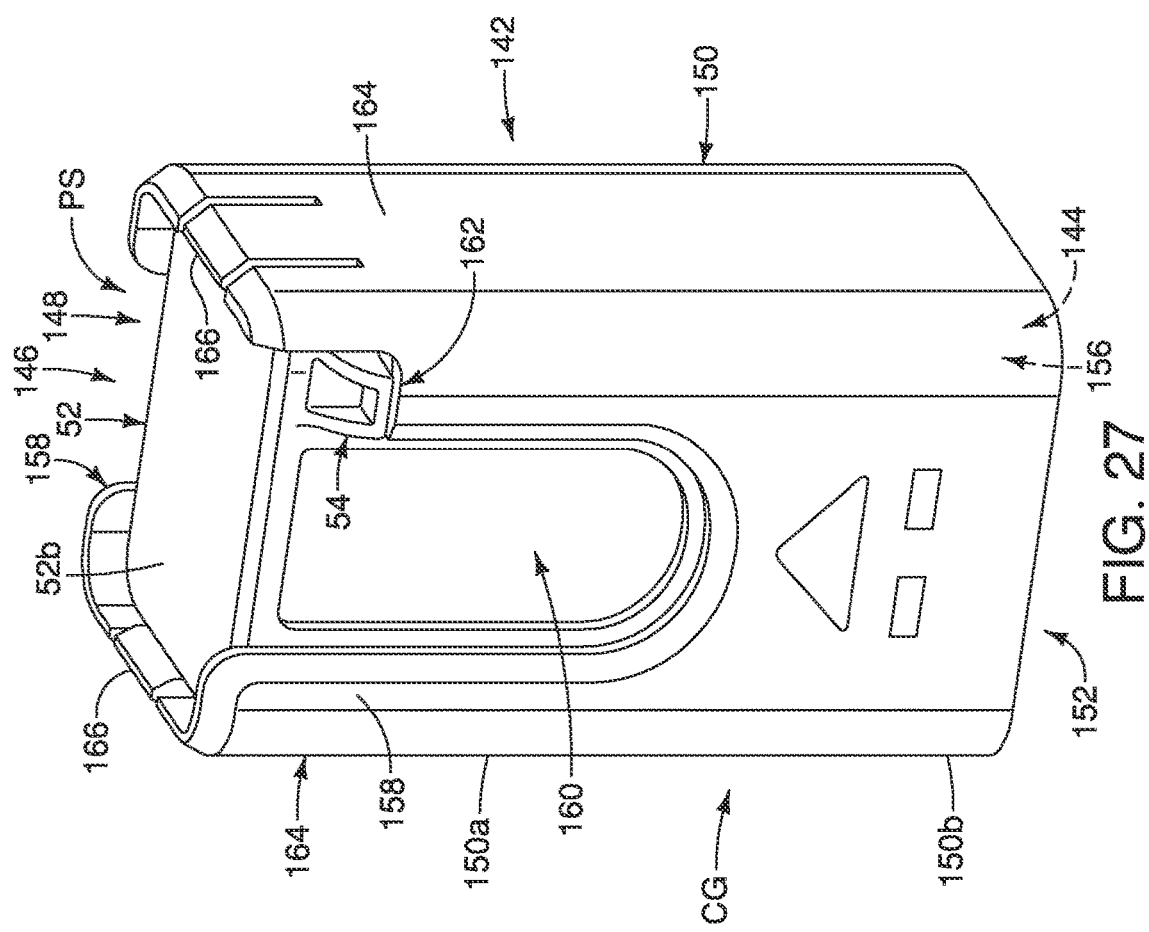
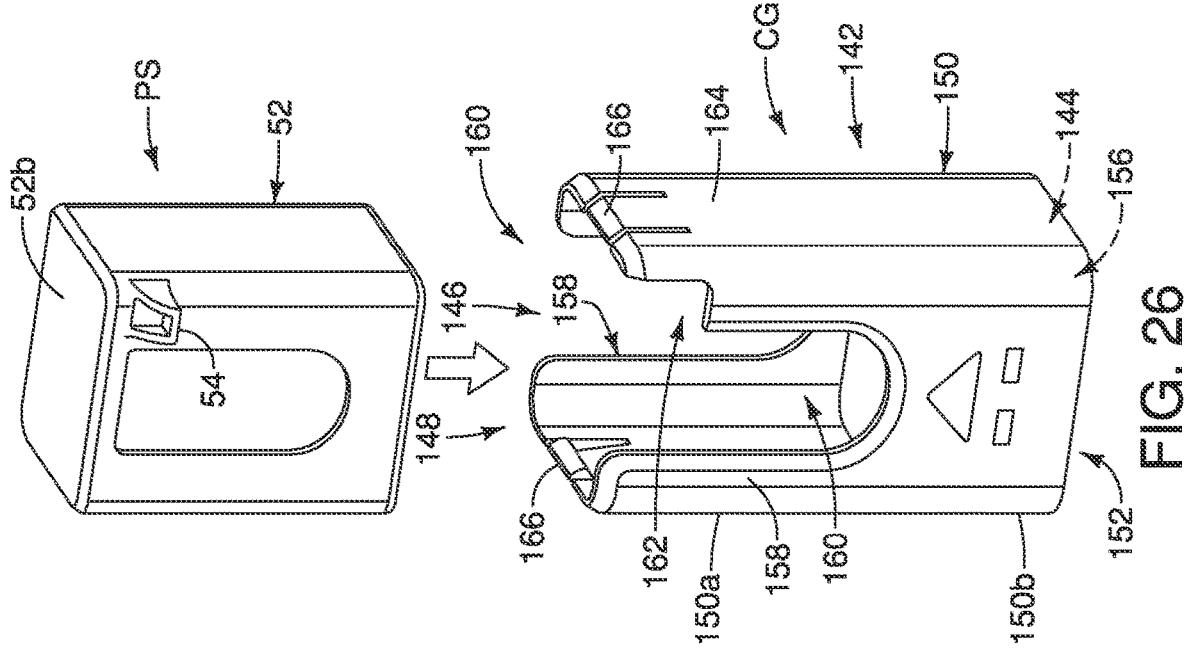

COMPONENT FOR HUMAN-POWERED VEHICLE

BACKGROUND

Technical Field

This disclosure generally relates to a component for a human-powered vehicle. More specifically, the present disclosure relates to a component for a human-powered vehicle that is connectable a power source.

Background Information

In recent years, some human-powered vehicles are provided with electrical components or devices to make it easier to operate the human-powered vehicle. Examples of such components include suspensions, transmission devices (e.g., derailleurs, internally geared hubs, etc.) and seatposts. Some of these components use electricity from an onboard power source, such as one or more batteries. The power source for the component either needs to be replaced or needs to be periodically recharged. In the case of where power source for the component needs to be periodically recharged, either the power source is plugged into a remote charger, or the power source is removed from the component and placed on a remote charger.

SUMMARY

For suitable operation of these electrical components, it is desired to receive electric power supply by properly establishing an electrical connection between these components and the power source.

Generally, the present disclosure is directed to various features of a component for a human-powered vehicle. The term "human-powered vehicle" as used herein refers to a vehicle that can be propelled by at least human driving force to produce propulsion, but does not include a vehicle using only a driving power other than human power. In particular, a vehicle solely using an internal combustion engine as a driving power is not included in the human-powered vehicle. The human-powered vehicle is generally assumed to be a compact, light vehicle that sometimes does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, a component is provided for a human-powered vehicle. The component basically comprises a power source connecting portion, an actuator and a first electronic controller circuitry. The power source connecting portion is configured to be connected to a power source. The power source connecting portion includes an attachment surface, a first terminal and a first detection terminal. The actuator is electrically connected to the power source connecting portion. The first electronic controller circuitry is configured to control the actuator with supply current provided from the power source. The first terminal is configured to be electrically connected to a power supply terminal of the power source. The first terminal is configured to supply the supply current to the actuator in a state where the first detection terminal is configured to be electrically connected to a second detection terminal of the power source. The first detection terminal is configured to contact to the second detection terminal after the first terminal contacts to the power supply terminal during connecting operation of the power source to the power source connecting portion.

With the component according to the first aspect, it is possible to properly receive power supply from the power source after properly establishing an electrical connection between the component and the power source.

In accordance with a second aspect of the present disclosure, the component according to the first aspect is configured so that the first detection terminal is configured to be no contact with the second detection terminal with a gap between the first detection terminal and the second detection terminal at a timing when the first terminal contacts to the power supply terminal during connecting operation of the power source to the power source connecting portion.

With the component according to the second aspect, it is possible to properly establish an electrical connection between the component and the power source by a timing when the first detection terminal contacts to the second detection terminal.

In view of the state of the known technology and in accordance with a third aspect of the present disclosure, a component is provided for a human-powered vehicle. The component basically comprises a power source connecting portion, an actuator and a first electronic controller circuitry. The power source connecting portion is configured to be connected to a power source. The power source connecting portion includes an attachment surface, a first terminal and a first detection terminal. The actuator is electrically connected to the power source connecting portion. The first electronic controller circuitry is configured to control the actuator with supply current provided from the power source. The first terminal is configured to be electrically connected to a power supply terminal of the power source. The first terminal is configured to supply the supply current to the actuator in a state where the first detection terminal is configured to be electrically connected to a second detection terminal of the power source. The first detection terminal is configured to be no contact with the second detection terminal with a gap being provided between the first detection terminal and the second detection terminal at a timing when the first terminal contacts to the power supply terminal during connecting operation of the power source to the power source connecting portion.

With the component according to the third aspect, it is possible to properly receives power supply from the power source after properly establishing an electrical connection between the component and the power source.

In accordance with a fourth aspect of the present disclosure, the component according to any one of the first aspect to the third aspect is configured so that the first terminal and the first detection terminal protrude from the attachment surface, the first terminal has a first contact portion, the first contact portion is configured to directly contact to the power supply terminal, the first detection terminal has a first detection contact portion, the first detection contact portion is configured to directly contact to the second detection terminal, and the first detection contact portion is closer to the attachment surface than the first contact portion in a disconnection state where the power source is not connected to the power source connecting portion.

With the component according to the fourth aspect, it is possible to properly establish a direct contact between the first contact portion and the power supply terminal by a timing when the first detection contact portion of the first detection terminal contacts to the second detection terminal.

In view of the state of the known technology and in accordance with a fifth aspect of the present disclosure, a component is provided for a human-powered vehicle. The component basically comprises a power source connecting portion, an actuator and a first electronic controller circuitry. The power source connecting portion is configured to be connected to a power source. The power source connecting portion includes an attachment surface, a first terminal and a first detection terminal. The first terminal and the first detection terminal protrude from the attachment surface. The actuator is electrically connected to the power source connecting portion. The first electronic controller circuitry is configured to control the actuator with supply current provided from the power source. The first terminal is configured to be electrically connected to a power supply terminal of the power source. The first terminal is configured to supply the supply current to the actuator in a state where the first detection terminal is configured to be electrically connected to a second detection terminal of the power source. The first terminal has a first contact portion. The first contact portion is configured to directly contact to the power supply terminal. The first detection terminal has a first detection contact portion. The first detection contact portion is configured to directly contact to the second detection terminal. The first detection contact portion is closer to the attachment surface than the first contact portion in a disconnection state where the power source is not connected to the power source connecting portion.

With the component according to the fifth aspect, it is possible to properly receives power supply from the power source after properly establishing an electrical connection between the component and the power source.

In accordance with a sixth aspect of the present disclosure, the component according to the fourth aspect or the fifth aspect is configured so that the first terminal has a first length extending from the attachment surface to the first contact portion in the disconnection state, and the first detection terminal has a second length extending from the attachment surface to the first detection contact portion, the first length being larger than the second length in the disconnection state.

With the component according to the sixth aspect, it is possible to further properly establish a direct contact between the first contact portion and the power supply terminal by a timing when the first detection contact portion of the first detection terminal contacts to the second detection terminal.

In accordance with a seventh aspect of the present disclosure, the component according to any one of the fourth aspect to the sixth aspect further comprises a power source receiving portion having a power source accommodating space configured to receive the power source in a connection state where the power source is connected to the power source connecting portion, and the first contact portion being located closer to an insertion opening of the power source accommodating space than the first detection contact portion in the disconnection state.

With the component according to the seventh aspect, it is possible to yet further properly establish a direct contact between the first contact portion and the power supply terminal by a timing when the first detection contact portion of the first detection terminal contacts to the second detection terminal.

In accordance with an eighth aspect of the present disclosure, the component according to any one of the first aspect to the seventh aspect is configured so that the first terminal and the first detection terminal are spring loaded terminal pins.

With the component according to the eighth aspect, it is possible to securely establish an electrical connection between the first terminal and the power supply terminal and an electrical connection between the first detection terminal and the second detection terminal.

In accordance with a ninth aspect of the present disclosure, the component according to any one of the first aspect to the eighth aspect is configured so that the power source connecting portion further includes a substrate, and the first terminal and the first detection terminal are mounted to the substrate.

With the component according to the ninth aspect, it is possible to mount the first terminal and the first detection terminal on the substrate.

In accordance with a tenth aspect of the present disclosure, the component according to any one of the first aspect to the ninth aspect is configured so that the power source connecting portion further includes a bypass circuit provided between the first terminal and the first detection terminal.

With the component according to the tenth aspect, it is possible to establish an electrical connection between the component and the power source via the bypass circuit.

In accordance with an eleventh aspect of the present disclosure, the component according to the tenth aspect is configured so that the bypass circuit includes a resistor.

With the component according to the eleventh aspect, it is possible to properly establish an electrical connection between the component and the power source via the resistor of the bypass circuit.

In accordance with a twelfth aspect of the present disclosure, the component according to any one of the first aspect to the eleventh aspect further comprises the power source including a second electronic controller circuitry configured to control the supply current in response to contact between the first detection terminal and the second detection terminal.

With the component according to the twelfth aspect, it is possible to properly receives power supply from the power source in response to contact between the first detection terminal and the second detection terminal.

In accordance with a thirteenth aspect of the present disclosure, the component according to the twelfth aspect is configured so that the power supply terminal has a power contact portion, the second detection terminal has a second detection contact portion, and the power contact portion and the second detection contact portion are located on a first plane in an attachment direction of the power source for connecting the power supply terminal to the first terminal and the second detection terminal to the first detection terminal.

With the component according to the thirteenth aspect, it is possible to simplify the configuration of the power source.

In accordance with a fourteenth aspect of the present disclosure, the component according to any one of the first aspect to the thirteenth aspect is configured so that the power source connecting portion further includes a cable receiving passageway for receiving an electrical cable connecting the first terminal to the actuator.

With the component according to the fourteenth aspect, it is possible to organize the electrical cable connecting the first terminal to the actuator.

In accordance with a fifteenth aspect of the present disclosure, the component according to the fourteenth aspect further comprises a cable holder configured to hold a portion of the electrical cable connecting the first terminal to the actuator.

With the component according to the fifteenth aspect, it is possible to prevent the electrical cable from falling off.

In accordance with a sixteenth aspect of the present disclosure, the component according to any one of the first aspect to the fifteenth aspect is configured so that the power source connecting portion further includes a second terminal.

With the component according to the sixteenth aspect, it is possible to properly establish an electrical connection between the component and the power source.

In accordance with a seventeenth aspect of the present disclosure, the component according to the sixteenth aspect is configured so that the second terminal is a spring loaded terminal pin.

With the component according to the seventeenth aspect, it is possible to securely establish an electrical connection between the component and the power source.

In accordance with an eighteenth aspect of the present disclosure, the component according to any one of the first aspect to the seventeenth aspect further comprises a base member, a movable mechanism and a link member movably coupling the movable mechanism to the base member, the power source connecting portion being attached to the link member, and the actuator being provided to one of the base member and the movable mechanism.

With the component according to the eighteenth aspect, it is possible to provide an electrically operable component.

In accordance with a nineteenth aspect of the present disclosure, the component according to the eighteenth aspect is configured so that the component is a derailleur.

With the component according to the nineteenth aspect, it is possible to provide an electrically operable derailleur.

In accordance with a twentieth aspect of the present disclosure, the component according to the eighteenth aspect or the nineteenth aspect is configured so that the link member includes an inner link and an outer link, and the power source connecting portion is attached to the outer link.

With the component according to the twentieth aspect, it is possible to suitably position the power source connecting portion on the link member.

Also, other objects, features, aspects and advantages of the disclosed component will become apparent to those skilled in the art from the following detailed description, which, taken in conjunction with the annexed drawings, discloses preferred embodiments of the component.

BRIEF DESCRIPTION OF THE DRAWINGS

Referring now to the attached drawings which form a part of this original disclosure.

FIG. 26 is a front perspective view of the charging device, showing a state in which the power source is removed from the charging device.

FIG. 27 is a front perspective view of the charging device, showing a state in which the power source is attached to the charging device.

DETAILED DESCRIPTION

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Figure 1:
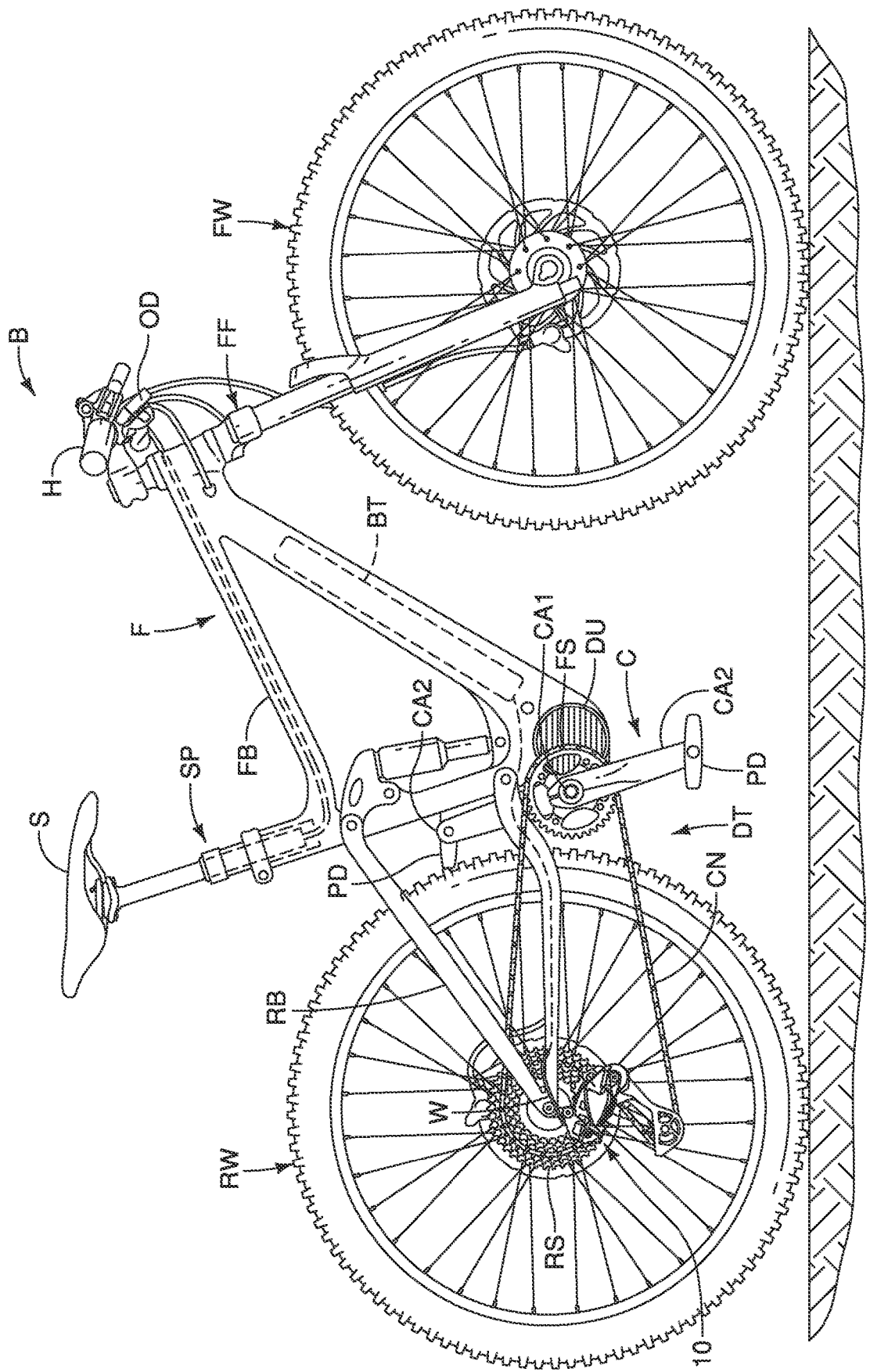
FIG. 1 is a side elevational view of human-powered vehicle or bicycle in accordance with one embodiment.

Referring initially to FIG. 1, a human-powered vehicle B is illustrated in accordance with one illustrative embodiment. In the illustrated embodiment, a bicycle is illustrated as an example of the human-powered vehicle B, and thus a bicycle is also referred to as a bicycle B. In the illustrated embodiment, a component 10 is provided for the human-powered vehicle B. In the illustrated embodiment, the component 10 is a derailleur, for example, and thus a derailleur is also referred to as a derailleur 10. Here, the bicycle B is illustrated as an electric assist bike. However, the derailleur 10 can be applied to any other type of bicycles such as, for example, a mountain bike, a cyclocross bicycle, a road bicycle, a city bike, a cargo bike, and a recumbent bike.

As shown in FIG. 1, the bicycle B includes a bicycle frame F that is supported by a rear wheel RW and a front wheel FW. The bicycle frame F basically includes a front frame body FB and a rear frame body RB (a swing arm). The bicycle frame F is also provided with a front fork FF and a handlebar H for steering the bicycle B. The bicycle B further includes an adjustable seatpost SP coupled to the seat tube of the bicycle frame F for support a bicycle seat S at the upper end.

The bicycle B further includes a drivetrain DT. Here, for example, the drivetrain DT is a chain-drive type that includes a crank C, a front sprocket FS, a plurality of rear sprockets RS and a chain CN. The crank C includes a crank axle CA1 and a pair of crank arms CA2. The crank axle CA1 is rotatably supported to the front frame body FB. The crank arms CA2 are provided on opposite ends of the crank axle CA1. A pedal PD is rotatably coupled to the distal end of each of the crank arms CA2. The front sprocket FS is provided on the crank C to rotate integrally with the crank axle CA1. The rear sprockets RS are provided on a hub of the rear wheel RW. The chain CN runs around the front sprocket FS and one of the rear sprockets RS. A human driving force is applied to the pedals PD by a rider of the bicycle B such that the driving force is transmitted via the front sprocket FS, the chain CN and the rear sprockets RS to the rear wheel RW. While the drivetrain DT is illustrated as a chain-drive type of drivetrain, the drivetrain DT can be selected from any type of drivetrain, and can be a belt-drive type or a shaft-drive type. Here, the bicycle B further includes a drive unit DU that is configured to apply a propulsion force to the crank axle CA1 of the bicycle B.

In the illustrated embodiment, the derailleur 10 is an electric rear derailleur. The derailleur 10 is configured to move the chain CN between the rear sprockets RS in response to either an automatic shift signals or commands from a cycle computer CC (FIG. 5), or shift signals or commands inputted by a user from an operating device OD such as an electric shift lever. A power supply BT is provided to the bicycle frame F for supplying electric power to various bicycle components. For example, the power supply BT can be electrically connected with an electrical cable to these bicycle components for supplying electrical power thereto. Here, the power supply BT is provided inside a downtube of the bicycle frame F. Alternatively, the power supply BT can be provided to another portion of the bicycle frame F.

In the illustrated embodiment, the following directional terms "front," "rear," "forward," "rearward," "left," "right," "lateral," "longitudinal", "upward," and "downward," as well as any other similar directional terms, refer to those directions which are determined on the basis of a rider sitting upright on the seat S of the bicycle B while facing the handlebar H of the bicycle B.

Figure 2:
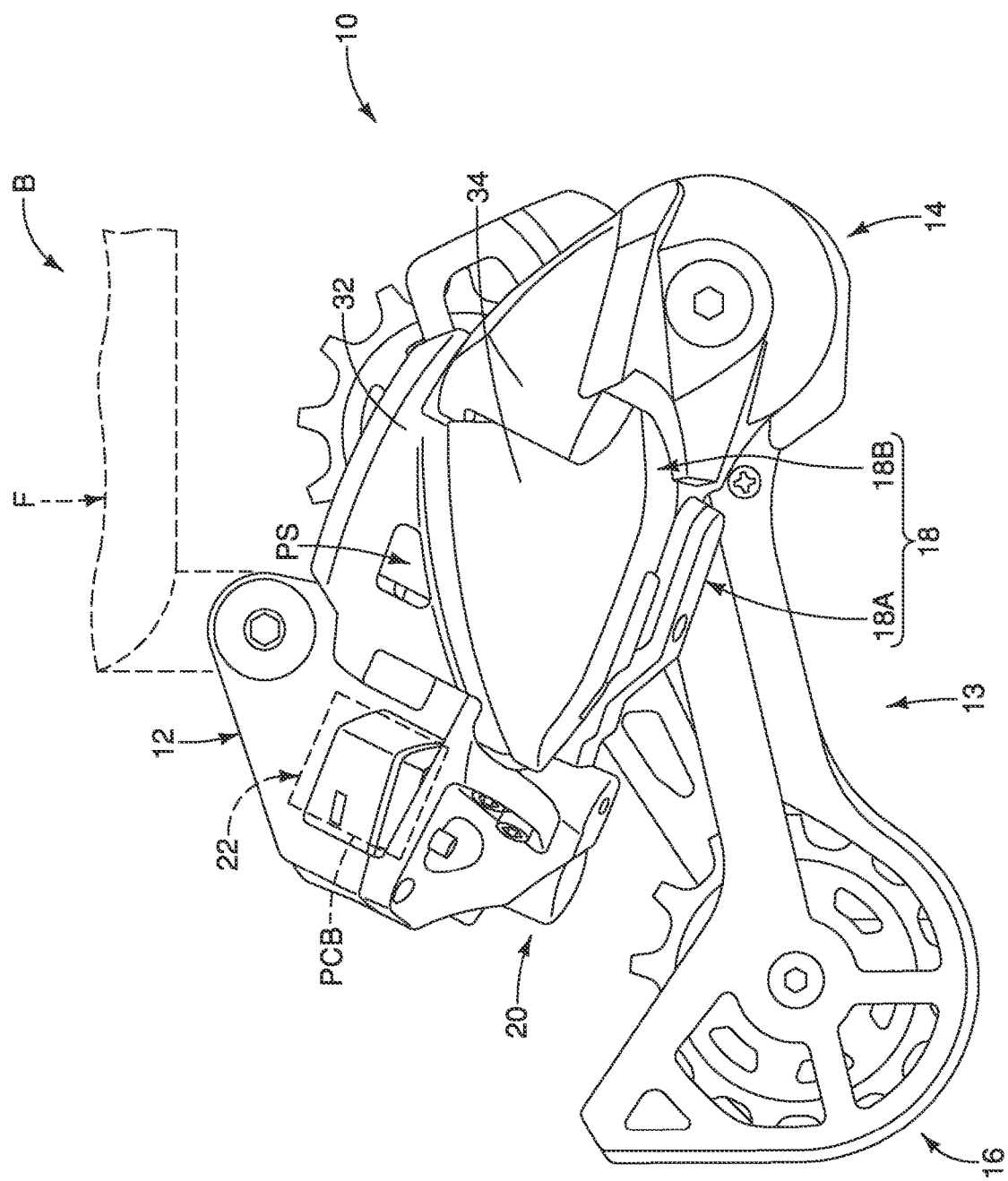
FIG. 2 is a side elevational view of a derailleur of the bicycle shown in FIG. 1.
Figure 3:
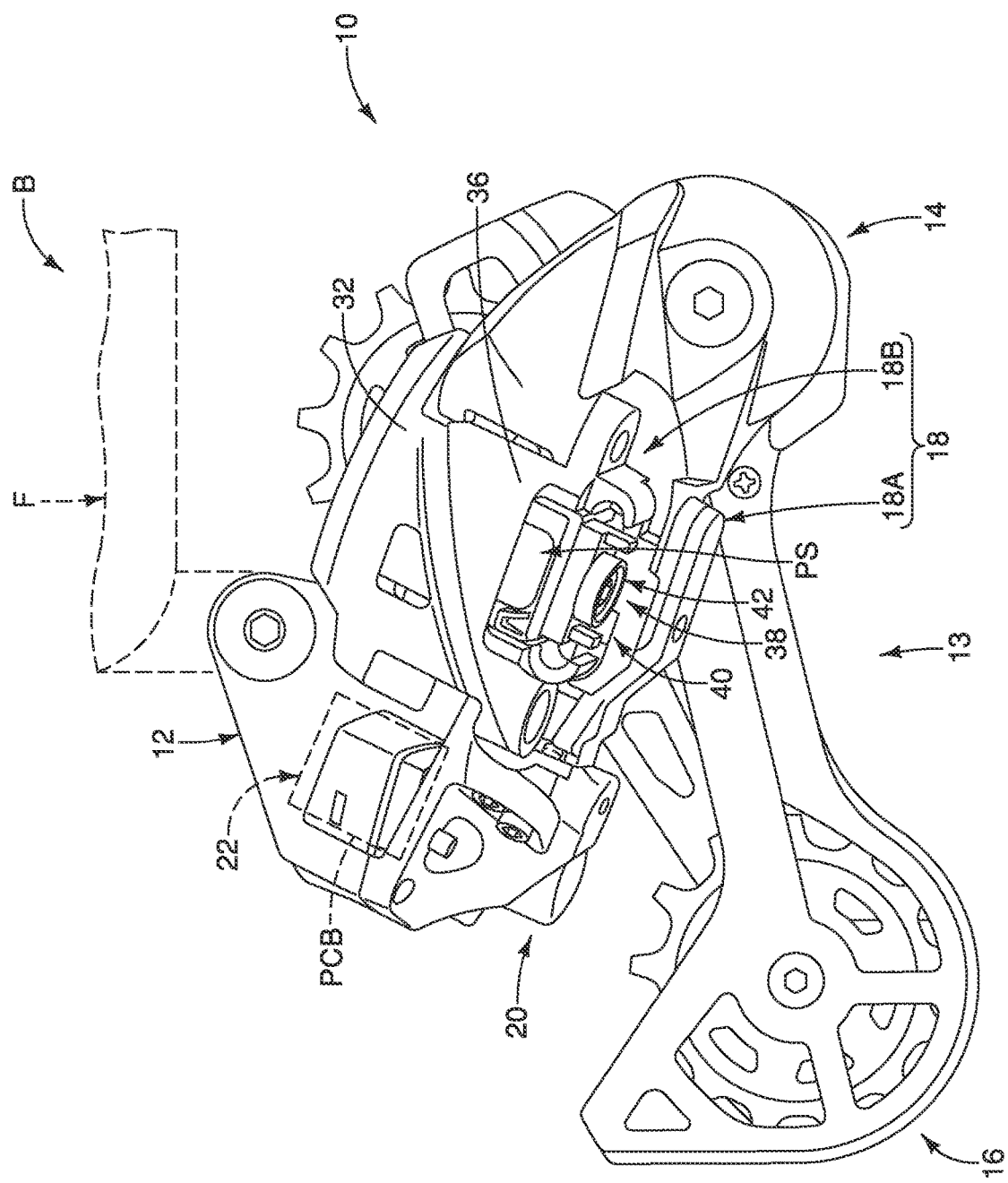
FIG. 3 is a side elevational view of the derailleur shown in FIG. 2, with a holder lid being removed from an outer link of the derailleur.
Figure 4:
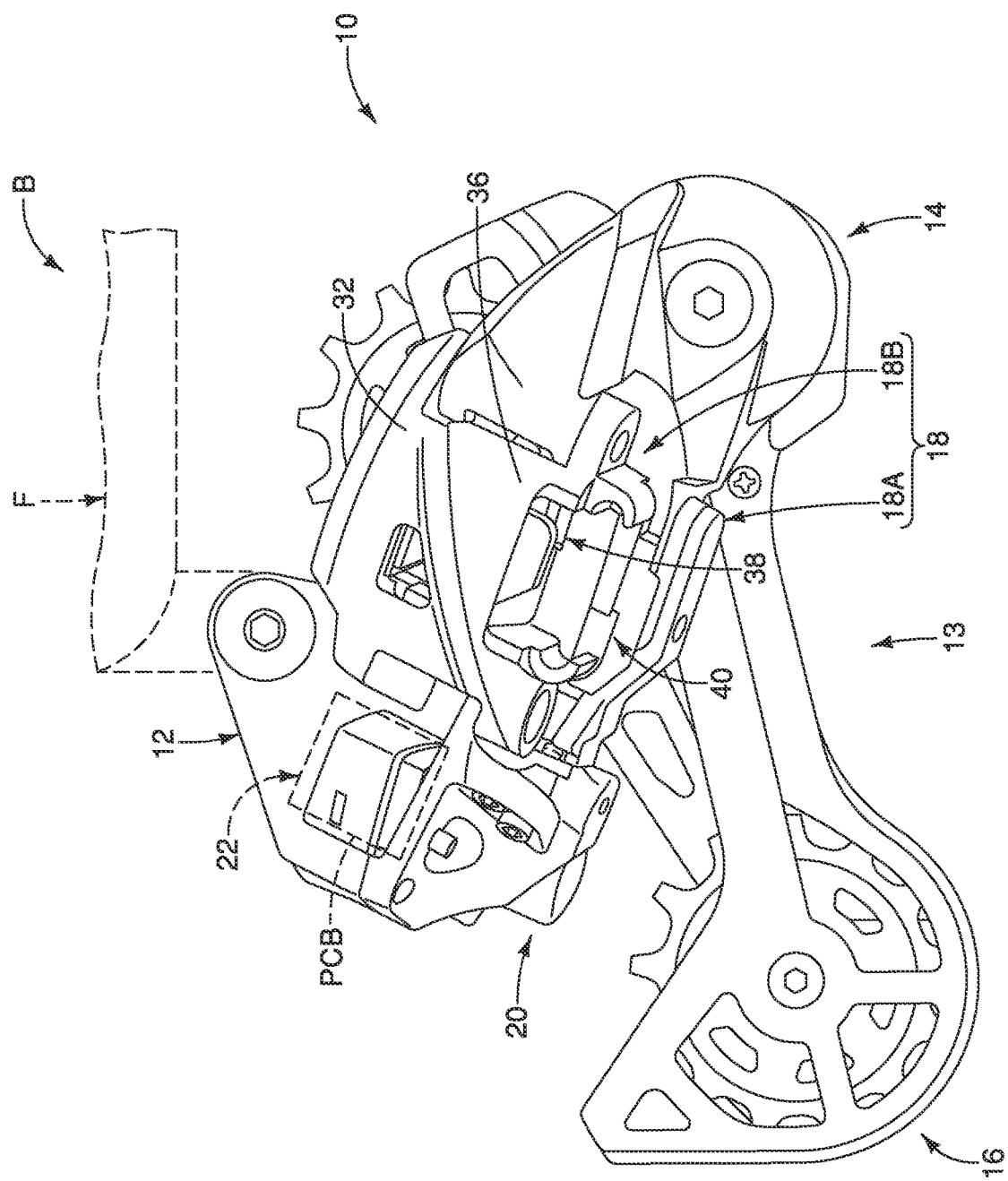
FIG. 4 is a side elevational view of the derailleur shown in FIG. 2, with a power source being further removed from the outer link of the derailleur.

Referring now to FIGS. 2 to 4, the derailleur 10 will be discussed herein in more detail. The derailleur 10 basically comprises a base member 12, and a movable mechanism 13 with a movable member 14 and a chain guide 16. The derailleur 10 further comprises a link member 18. The link member 18 movably couples the movable member 14 to the base member 12. Thus, in the illustrated embodiment, the component 10 further comprises the base member 12, the movable mechanism 13 and the link member 18 movably coupling the movable mechanism 13 to the base member 12. The base member 12 is configured to be attached to the frame F of the bicycle B using a fastener, such as a fastening bolt. The movable member 14 is movably coupled to the base member 12 via the link member 18. The chain guide 16 is pivotally coupled to the movable member 14.

As mentioned above, the link member 18 movably connects the movable member 14 to the base member 12. Specifically, the link member 18 is a linkage. In particular, the link member 18 includes an inner link 18A and an outer link 18B. The inner link 18A and the outer link 18B enable relative movement of the movable member 14 with respect to the base member 12 as the derailleur 10 shifts the chain CN in a lateral direction of the bicycle B. Here, the inner link 18A and the outer link 18B are pivotally connected to the base member 12 and the movable member 14 to define a four bar linkage. The four bar linkage preferably further includes a biasing member (e.g., a torsion spring) that is interposed between the inner link 18A and the outer link 18B to take up any play.

As mentioned above, in the illustrated embodiment, the derailleur 10 is an electric rear derailleur. Thus, here, the derailleur 10 further comprises an actuator 20. Here, the derailleur 10 is further equipped with a power source or supply PS for supplying electric power to various electrical components including the actuator 20. Thus, in the illustrated embodiment, the component 10 further comprises the power source PS. In the illustrated embodiment, the power source PS is a rechargeable battery, such as a lithium-ion battery. Of course, the power source PS can be selected from any type of rechargeable battery. The power source PS is detachably and reattachably attached to the derailleur 10. In the illustrated embodiment, the power source PS is provided on the outer link 18B, as described in detail later. The actuator 20 is configured to move the movable member 14 relative to the base member 12 in response to a shifting operation. The shifting operation can be a manual shifting operation in which the operating device OD or some other operating device is operated to generate the shift signals that are transmitted to the actuator 20 to operate the derailleur 10. The shifting operation can also be an automatic shifting operation in which the shift signals are generated by the cycle computer CC (FIG. 5) based on one or more operating conditions of the bicycle B. The actuator 20 can be any type of actuator as needed and/or desired. Thus, the actuator 20 is not limited to the actuator 20 illustrated herein. In the illustrated embodiment, the actuator 20 is an electrical actuator that drives according to the shift signals transmitted either through wireless signals from the operating device OD, or through the electrical cable W. The electrical cable W can use either power line communication (PLC) or a dedicated signal wire to transmit the shift signals to the actuator 20. In the case of the actuator 20 of the illustrated embodiments, an example is shown in which the actuator 20 drives according to the shift signals transmitted through wireless signals from the operating device OD. In the illustrated embodiment, the actuator 20 includes a reversible electric motor and a gear reduction unit.

Here, the actuator 20 is provided to the base member 12. The electric motor of the actuator 20 is operatively connected to one of the inner link 18A and the outer link 18B of the link member 18 via the gear reduction unit to move the movable member 14 relative to the base member 12. In other words, the electric motor of the actuator 20 is configured to apply a torque between the link member 18 and the base member 12 such that the link member 18 pivots relative to the base member 12. Of course, the actuator 20 is not limited to this location. The actuator 20 can also be provided to the movable mechanism 13 to move the movable member 14 relative to the base member 12. Thus, the actuator 20 is provided to one of the base member 12 and the movable mechanism 13.

Figure 5:
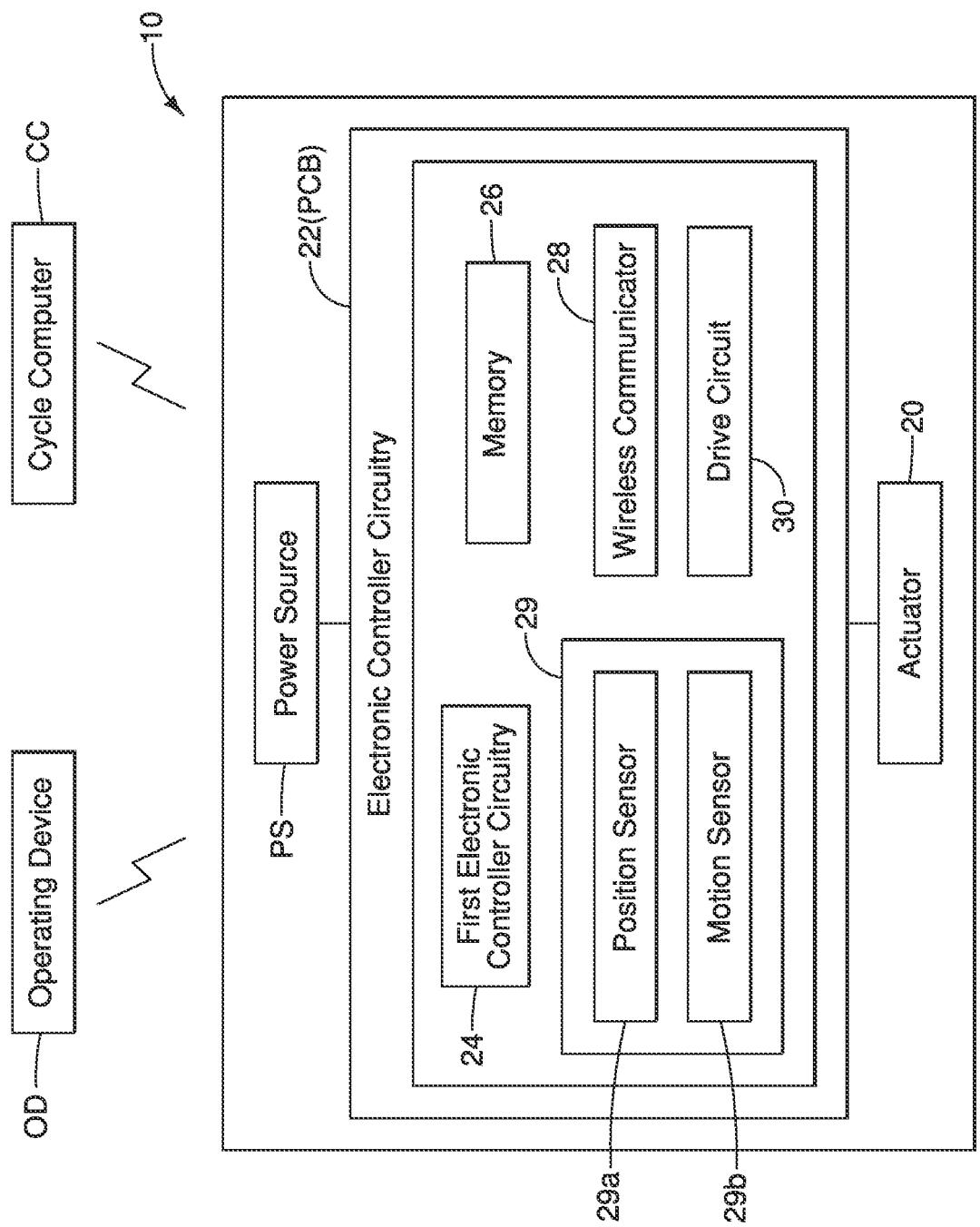
FIG. 5 is a simplified block diagram of an operation system of the derailleur.

In the illustrated embodiment, the derailleur 10 further comprises an electronic controller circuitry 22. The electronic controller circuitry 22 is provided to the base member 12. Of course, the electronic controller circuitry 22 is not limited to this location. The electronic controller circuitry 22 can be provided to the movable mechanism 13. As shown in FIG. 5, the electronic controller circuitry 22 includes a first electronic controller circuitry 24. The first electronic controller circuitry 24 is an electric controller. The first electronic controller circuitry 24 includes a microcomputer or central processing unit (CPU). The term "controller" as used herein refers to hardware that executes a software program, and does not include a human. The first electronic controller circuitry 24 is configured to control the actuator 20 with supply current provided from the power source PS. In the illustrated embodiment, the first electronic controller circuitry 24 receives the shift signals transmitted from the operating device OD or the cycle computer CC, and generates control signals to control various electrical components including the actuator 20.

The electronic controller circuitry 22 further includes at least one computer storage device or memory 26. The memory 26 is configured to store settings, programs, data, calculations and/or results of the first electronic controller circuitry 24. The memory 26 is any computer storage device or any non-transitory computer-readable medium with the sole exception of a transitory, propagating signal. For example, the memory 26 can include nonvolatile memory and volatile memory, and can include a ROM (Read Only Memory) device, a RAM (Random Access Memory) device, a hard disk, a flash drive, etc.

The electronic controller circuitry 22 further includes at least one electric portion or element other than the actuator 20. In the illustrated embodiment, the electric portion includes a wireless communicator 28. In the illustrated embodiment, alternatively or additionally, the electric portion includes a detector 29. The wireless communicator 28 is configured to wirelessly communicate with the operating device OD for operating the derailleur 10. In particular, in the illustrated embodiment, the first electronic controller circuitry 24 receives the shift signals transmitted from the operating device OD or the cycle computer CC via the wireless communicator 28 to generate the control signals to control the actuator 20. The wireless communicator 28 is a hardware device capable of transmitting and/or receiving an analog or digital signal wirelessly via an antenna. The terms "wireless communicator" as used herein include a receiver, a transmitter, a transceiver, a transmitter-receiver, and contemplates any device or devices, separate or combined, capable of transmitting and/or receiving wireless communication signals, including command or other signals related to some function of the derailleur 10 being controlled. The wireless communication signals can be radio frequency (RF) signals having a frequency that is in a 2.4 GHz band or a 5.0 GHz band, ultra-wide band communication signals, or Bluetooth® communications or any other type of signal suitable for short range wireless communications as understood in the human-powered vehicle field. In the illustrated embodiment, the detector 29 includes at least one of a position sensor 29a and a motion sensor 29b. The position sensor 29a is provided for detecting an operational position of the actuator 20. In the illustrated embodiment, the position sensor 29a includes a magnetic sensor. However, the position sensor 29a can be any type of sensing device for detecting the operational position of the actuator 20. In the illustrated embodiment, the operational position of the actuator 20 detected by the position sensor 29a can be utilized for controlling the actuator 20, for example. The motion sensor 29b is provided for detecting motion states of the bicycle B. In the illustrated embodiment, the motion sensor 29b includes an accelerometer. However, the motion sensor 29b can be any type of sensing device for detecting the motion states of the bicycle B. In the illustrated embodiment, the motion states of the bicycle B detected by the motion sensor 29b can be utilized for a status control of the wireless communicator 28, for example.

The electronic controller circuitry 22 further includes a driver circuit 30. In the illustrated embodiment, the driver circuit 30 can include one or more ICs. The driver circuit 30 receives the control signals from the first electronic controller circuitry 24, and drives the actuator 20 according to the control signals from the first electronic controller circuitry 24. In particular, the actuator 20 is electrically connected to the power source PS through the driver circuit 30, and is driven by turning on/off power supply through the driver circuit 30 according to the control signals from the electronic controller circuitry 24.

In the illustrated embodiment, the electronic controller circuitry 22 includes one or more circuit boards PCB on which the first electronic controller circuitry 24, the memory 26, the wireless communicator 28, the detector 29 and the driver circuit 30 are mounted, and the one or more circuit boards PCB are disposed inside the base member 12.

Referring back to FIGS. 2 to 4, the configurations of the derailleur 10 will be further described in detail. As seen in FIG. 2, the outer link 18B includes an outer link body 32 and a holder lid 34. As seen in FIGS. 3 and 4, the outer link body 32 has a power source receiving portion 36. Thus, in the illustrated embodiment, the component 10 further comprises the power source receiving portion 36. The power source receiving portion 36 is configured to receive the power source PS. Specifically, the power source receiving portion 36 serves as a battery holder or case. The power source receiving portion 36 has a power source accommodating space 38 with an insertion opening 40 at a lower end. In the illustrated embodiment, the power source PS is inserted into the power source accommodating space 38 through the insertion opening 40 and is provided inside the power source receiving portion 36 in a state where the power source PS is installed to the derailleur 10.

The holder lid 34 is detachably and reattachably attached to the outer link body 32. The holder lid 34 covers a lower portion of the outer link body 32 to close the insertion opening 40. The holder lid 34 biases the power source PS away from the holder lid 34 via a biasing or spring mechanism 42 in a state where the holder lid 34 is attached to the outer link body 32 to ensure an electrical connection between the power source PS and the derailleur 10. Thus, the holder lid 34 is provided to protect the outer link body 32 and the power source PS and to attach/detach the power source PS to/from the derailleur 10.

Figure 7:
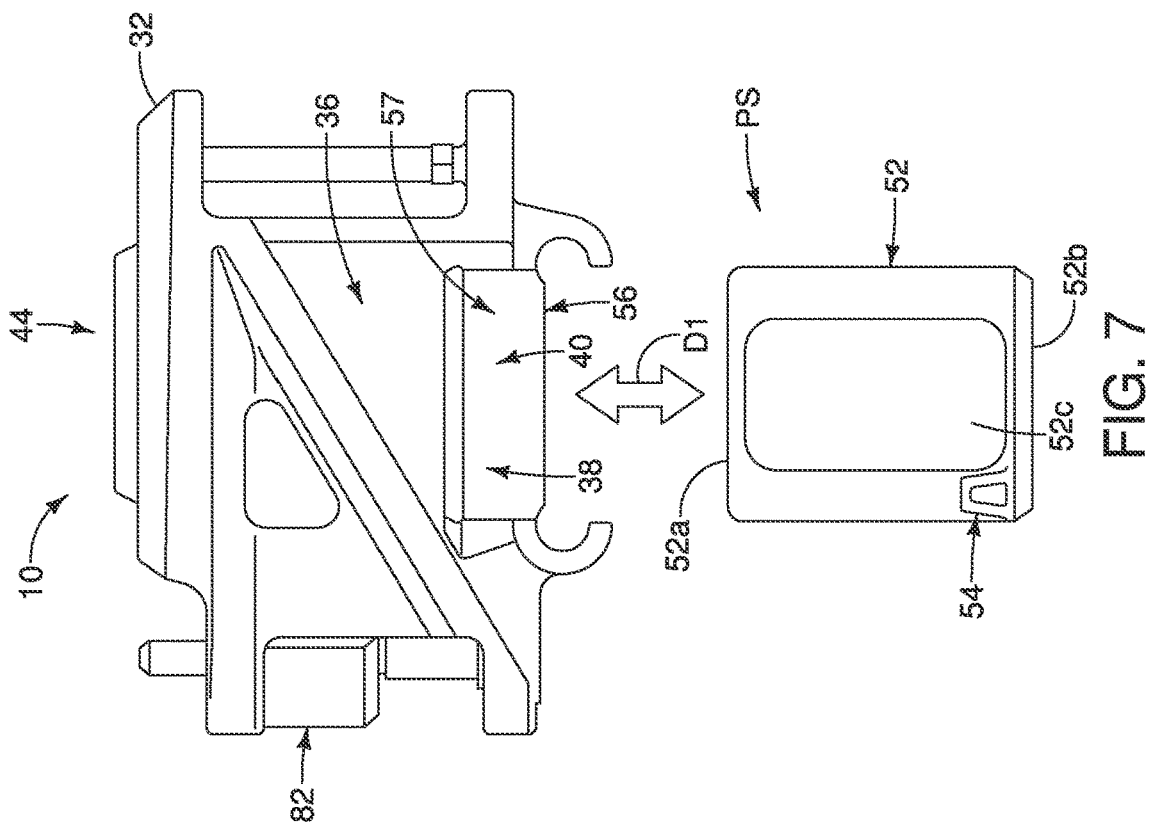
FIG. 7 is a side view of the outer link, with the power source being removed from the power source receiving portion of the outer link.
Figure 6:
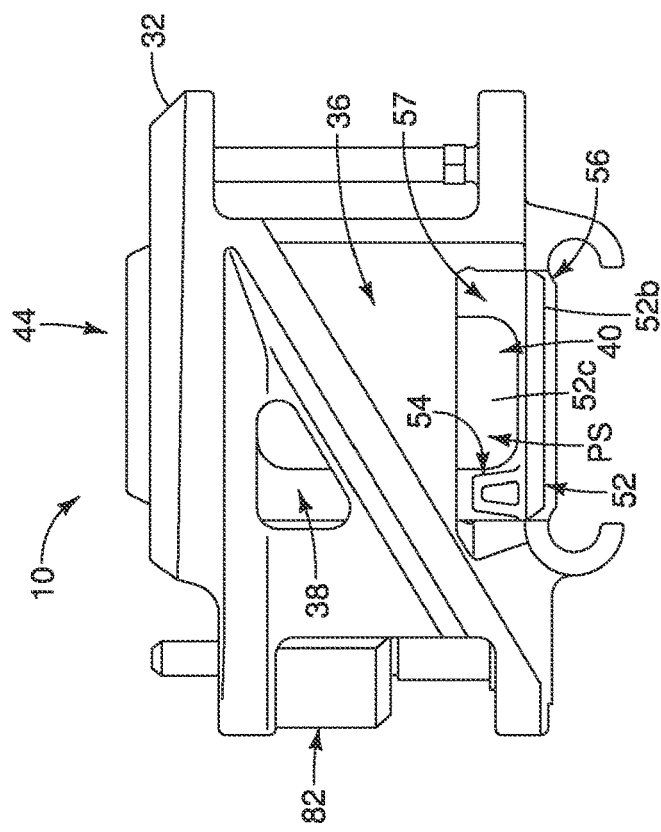
FIG. 6 is a side view of the outer link, with the power source being disposed inside a power source receiving portion of the outer link.
Figure 8:
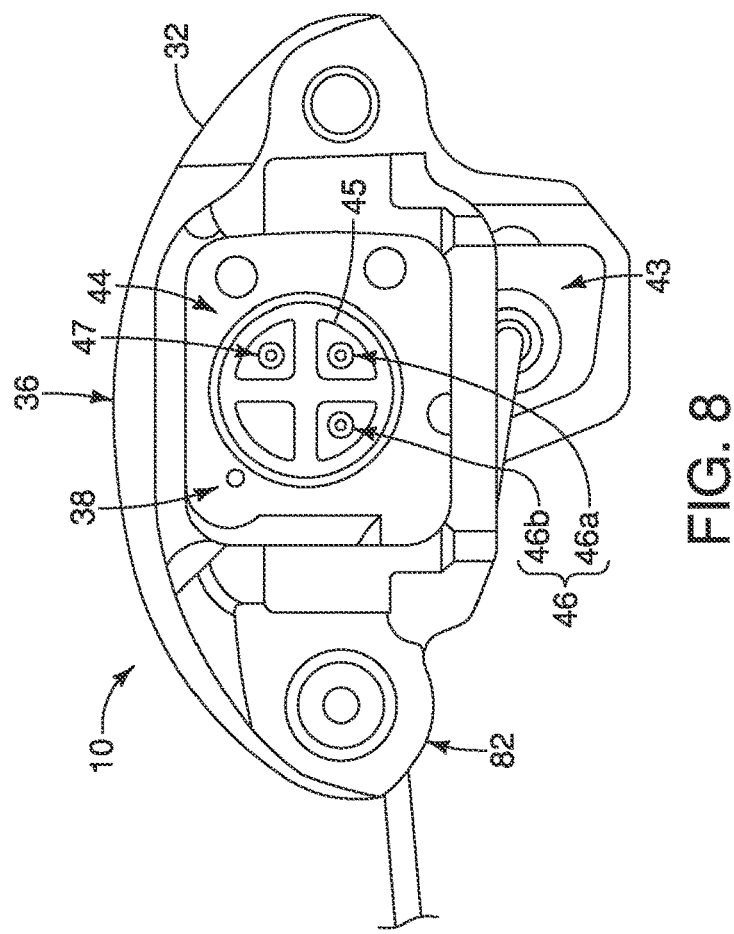
FIG. 8 is a normal bottom view of the outer link, with the power source being removed from the power source receiving portion of the outer link to show a power source connecting portion.

As seen in FIGS. 6 to 8, the derailleur 10 further includes a power source connecting portion 44. Thus, in the illustrated embodiment, the component 10 comprises the power source connecting portion 44, the actuator 20 and the first electronic controller circuitry 24. The power source connecting portion 44 is configured to be connected to the power source PS. In the illustrated embodiment, the power source connecting portion 44 is a connector unit that serves as an electrical connector for electrically connecting the power source PS to the derailleur 10. Here, the power source connecting portion 44 can be directly or indirectly connected to the power source PS. Furthermore, the power source PS is configured to be mounted to the power source connecting portion 44. In particular, the power source connecting portion 44 is provided to form a closed upper end of the power source accommodating space 38 of the power source receiving portion 36 such that the power source connecting portion 44 makes contact with the power source PS and is electrically connected to the power source PS in a state where the power source PS is installed to the derailleur 10. In other words, in the illustrated embodiment, the power source receiving portion 36 has the power source accommodating space 38 configured to receive the power source PS in a connection state T14 where the power source PS is connected to the power source connecting portion 44. Thus, the power source connecting portion 44 is provided to electrically connect the power source PS and the derailleur 10 and to supply electric power from the power source PS to the derailleur 10.

In the illustrated embodiment, various electric portions of the derailleur 10 are internally and electrically connected to the power source connecting portion 44 for receiving power supply from the power source PS. In particular, in the illustrated embodiment, the electronic controller circuitry 22 that drives the actuator 20 is electrically connected to the power source connecting portion 44. Thus, the actuator 20 is electrically connected to the power source connecting portion 44.

As seen in FIG. 8, the power source connecting portion 44 includes an attachment surface 45, a first terminal 46a and a first detection terminal 47. The power source connecting portion 44 further includes a second terminal 46b. Specifically, in the illustrated embodiment, the derailleur 10 includes a pair of power terminals as the first and second terminals 46a and 46b. Thus, in the illustrated embodiment, the first and second terminals 46a and 46b of the derailleur 10 are also referred to as power terminals 46. In the illustrated embodiment, the power terminals 46 are electrodes that are electrically connected to the power source PS to receive power supply from the power source PS in a state where the power source PS is installed to the derailleur 10. Furthermore, the first detection terminal 47 is an electrode that is electrically connected to the power source PS to detect a connection of the power source PS relative to the derailleur 10 in a state where the power source PS is installed to the derailleur 10.

Figure 9:
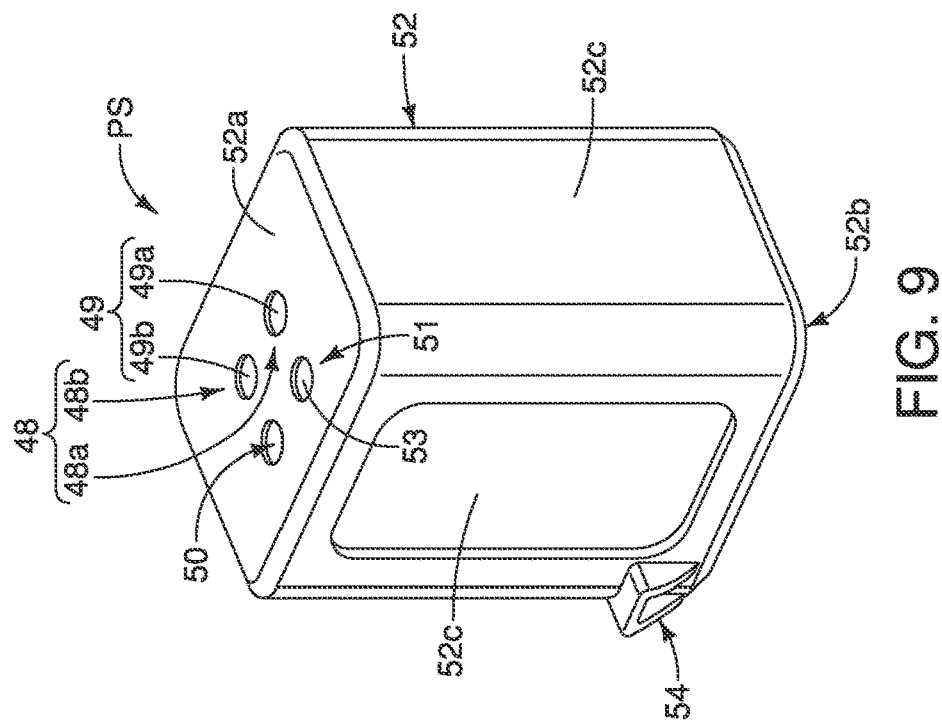
FIG. 9 is a perspective view of the power source.

Specifically, as seen in FIG. 9, the power source PS includes a first power supply terminal 48a and a second power supply terminal 48b. In the illustrated embodiment, the power source PS includes a pair of positive and negative power supply terminals as the first and second power supply terminals 48a and 48b, respectively. Thus, in the illustrated embodiment, the first and second power supply terminals 48a and 48b of the power source PS are also referred to as power supply terminals 48. The power supply terminals 48 are configured to be used for discharging electricity from the power source PS and for recharging electricity to the power source PS. Specifically, the first and second terminals 46a and 46b are configured to be electrically connected to the first and second power supply terminals 48a and 48b, respectively. In particular, in the illustrated embodiment, the first terminal 46a is configured to be electrically connected to the power supply terminal 48 of the power source PS. Thus, the power terminals 46 of the power source connecting portion 44 are configured to be electrically connected to the power supply terminals 48 of the power source PS, respectively. In the illustrated embodiment, the first and second power supply terminals 48a and 48b have first and second power contact portions 49a and 49b, respectively, that are configured to directly contact to the first and second terminals 46a and 46b in a state where the power source PS is installed to the derailleur 10. In the illustrated embodiment, the first and second power contact portions 49a and 49b are also referred to as power contact portions 49. Thus, in the illustrated embodiment, the power supply terminal 48 has the power contact portion 49.

Figure 28:
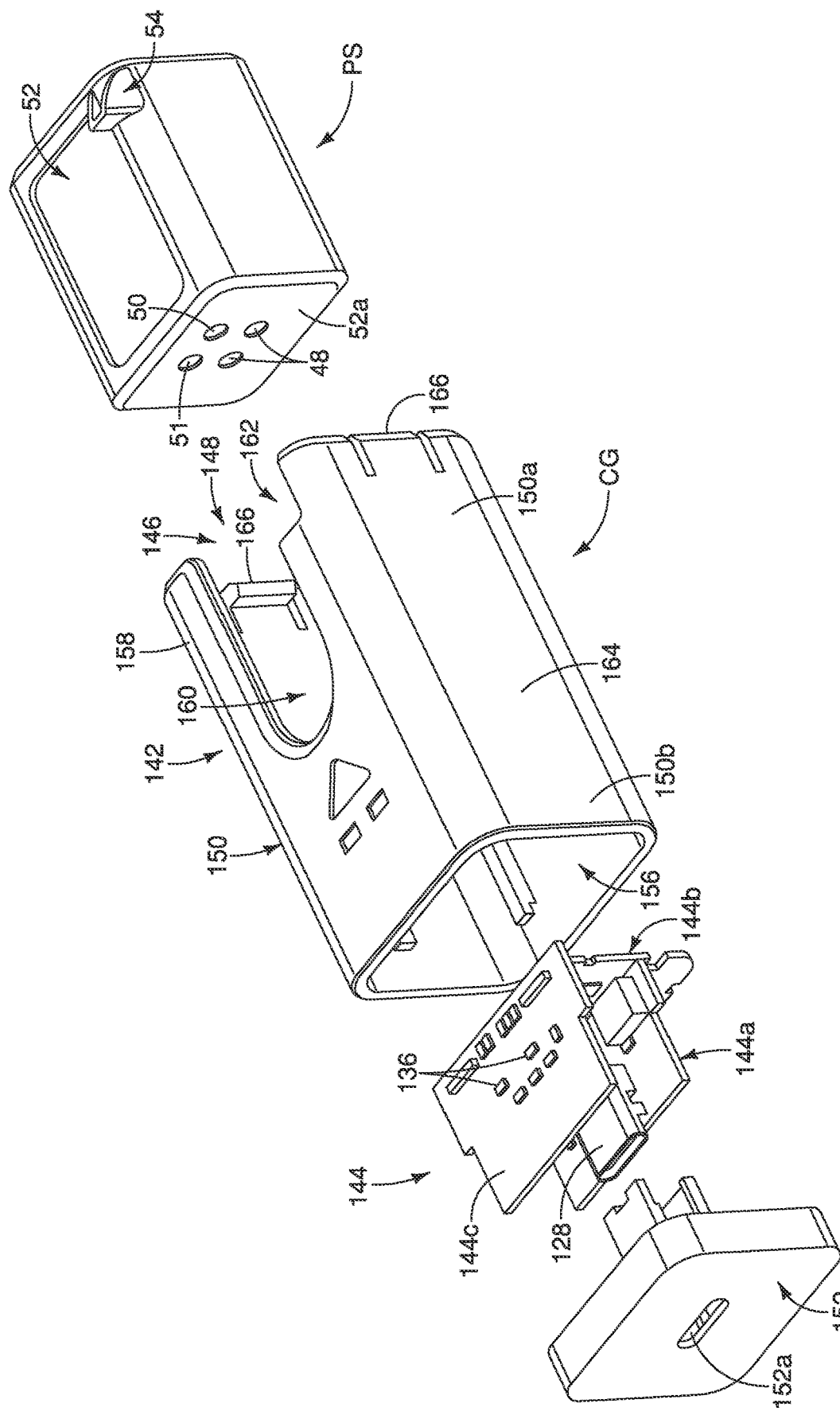
FIG. 28 is an exploded view of the charging device.

As also seen in FIG. 9, the power source PS further includes a thermal terminal 50 and a second detection terminal 51. The thermal terminal 50 is configured to be used for monitoring information related to a temperature of the power source PS in a state where the power source PS is charged by a charging device CG (FIGS. 26 to 28). In the illustrated embodiment, as seen in FIG. 8, the power source connecting portion 44 does not include a terminal corresponding to the thermal terminal 50 of the power source PS. Thus, the power source connecting portion 44 is configured to be coupled to the power source PS without being electrically connected to the thermal terminal 50 of the power source PS. On the other hand, the second detection terminal 51 is configured to be used for detecting a connection of the power source PS relative the derailleur 10. Specifically, the second detection terminal 51 is provided corresponding to the first detection terminal 47, and the second detection terminal 51 is configured to be electrically connected to the first detection terminal 47 in a state where the power source PS is installed to the derailleur 10. In particular, in the illustrated embodiment, the second detection terminal 51 has a second detection contact portion 53. The second detection contact portion 53 is configured to directly contact to the first detection terminal 47 in a state where the power source PS is installed to the derailleur 10.

As seen in FIG. 9, the power source PS includes a power source housing 52. The power supply terminals 48, the thermal terminal 50 and the second detection terminal 51 are exposed from a top surface 52a of the power source housing 52. The power source housing 52 basically has a rectangular overall shape, and has the top surface 52a, a bottom surface 52b opposite to the top surface 52a, and side surfaces 52c extending between the top surface 52a and the bottom surface 52b. In the illustrated embodiment, the power source PS includes a protrusion 54. The protrusion 54 protrudes outward from one of the side surfaces 52c of the power source housing 52 that mainly faces outward in the lateral direction of the bicycle B in a state where the power source PS is installed to the bicycle derailleur 10 (FIG. 3). In particular, the protrusion 54 is located at a lower corner portion of the side surface 52c. The protrusion 54 is indicative of a proper mounting orientation of the power source PS to the bicycle derailleur 10 and is utilized to restrict mounting of the power source PS to the bicycle derailleur 10 to the proper mounting orientation of the power source PS. In the illustrated embodiment, as seen in FIG. 9, the first and second power supply terminals 48a and 48b are arranged next to each other. In particular, the first and second power supply terminals 48a and 48b are arranged relative to each other in a direction along one edge of the top surface 52a. Similarly, the thermal terminal 50 and the second detection terminal 51 are arranged next to each other. In particular, the thermal terminal 50 and the second detection terminal 51 are arranged relative to each other in a direction along another one edge of the top surface 52a. Specifically, in the illustrated embodiment, the first and second power supply terminals 48a and 48b, the thermal terminal 50 and the second detection terminal 51 are arranged in a 2×2 matrix. In the illustrated embodiment, the first and second power supply terminals 48a and 48b are not diagonally arranged relative to each other in the matrix. The thermal terminal 50 and the second detection terminal 51 are not diagonally arranged relative to each other in the matrix. However, the first and second power supply terminals 48a and 48b, the thermal terminal 50 and the second detection terminal 51 are not limited to this arrangement, and can be arranged in a different manner, as needed and/or desired.

In the illustrated embodiment, as seen in FIGS. 6 and 7, the power source receiving portion 36 of the outer link body 32 has a lower section 56. The lower section 56 axially extends in an attachment direction D1 of the power source PS along a longitudinal center axis of the power source accommodating space 38. The lower section 56 defines the insertion opening 40 of the power source accommodating space 38 through which the power source PS is inserted to the power source accommodating space 38 in a state where the power source PS is installed to the derailleur 10, as seen in FIG. 6. In the illustrated embodiment, the lower section 56 does not entirely or continuously surround the lower portion of the power source accommodating space 38, and includes a cut-out or notch 57 that receives the protrusion 54 of the power source PS in a state where the power source PS is installed to the bicycle derailleur 10. In other words, the lower section 56 continuously and circumferentially extends around the lower portion of the power source PS, except for the cut-out 57, in a state where the power source PS is installed to the bicycle derailleur 10.

Therefore, when the power source PS is inserted to the power source receiving portion 36 in the proper mounting orientation of the power source PS, as shown in FIGS. 6 and 7, the lower section 56 does not contact the protrusion 54 and can receive the protrusion 54 within the cut-out 57. Thus, the lower section 56 allows the power source PS to be installed in the proper mounting orientation of the power source PS. On the other hand, when the power source PS is inserted to the power source receiving portion 36 in an improper mounting orientation of the power source PS, the lower section 56 contacts the protrusion 54 and prevents the power source PS from being installed to the bicycle derailleur 10. Accordingly, in the illustrated embodiment, the lower section 56 serves as a first prevention portion of the bicycle derailleur 10, while the protrusion 54 of the power source PS serves as a second prevention portion that cooperates with the first prevention portion to prevent the power source PS from being improperly installed to the bicycle derailleur 10. Thus, the lower section 56 is configured to restrict mounting of the power source PS to the power source receiving portion 36 to a single mounting orientation. In the illustrated embodiment, the lower section 56 and the protrusion 54 cooperatively form a prevention structure or mechanism of the bicycle B for preventing the power source PS from being improperly installed to the bicycle derailleur 10.

In the illustrated embodiment, an example is shown in which the protrusion 54 protrudes outward from one of the side surfaces 52c of the power source housing 52 that faces outward in the lateral direction of the bicycle B in a state where the power source PS is installed to the bicycle derailleur 10. However, the protrusion 54 is not limited to this location. The protrusion 54 can be located on one of the side surfaces 52c of the power source housing 52 that mainly faces inward in the lateral direction or mainly faces forward (or rearward) in a longitudinal direction of the bicycle B. In this case, the cut-out 57 can also be provided to the power source receiving portion 36 at the location corresponding to the location of the protrusion 54. Furthermore, the cut-out 57 is not also limited to the shape or size shown in FIGS. 6 and 7, and can be different as long as the cut-out 57 can receive the protrusion 54 therewithin in a state where the power source PS is inserted to the power source receiving portion 36 in the proper mounting orientation of the power source PS.

Figure 10:
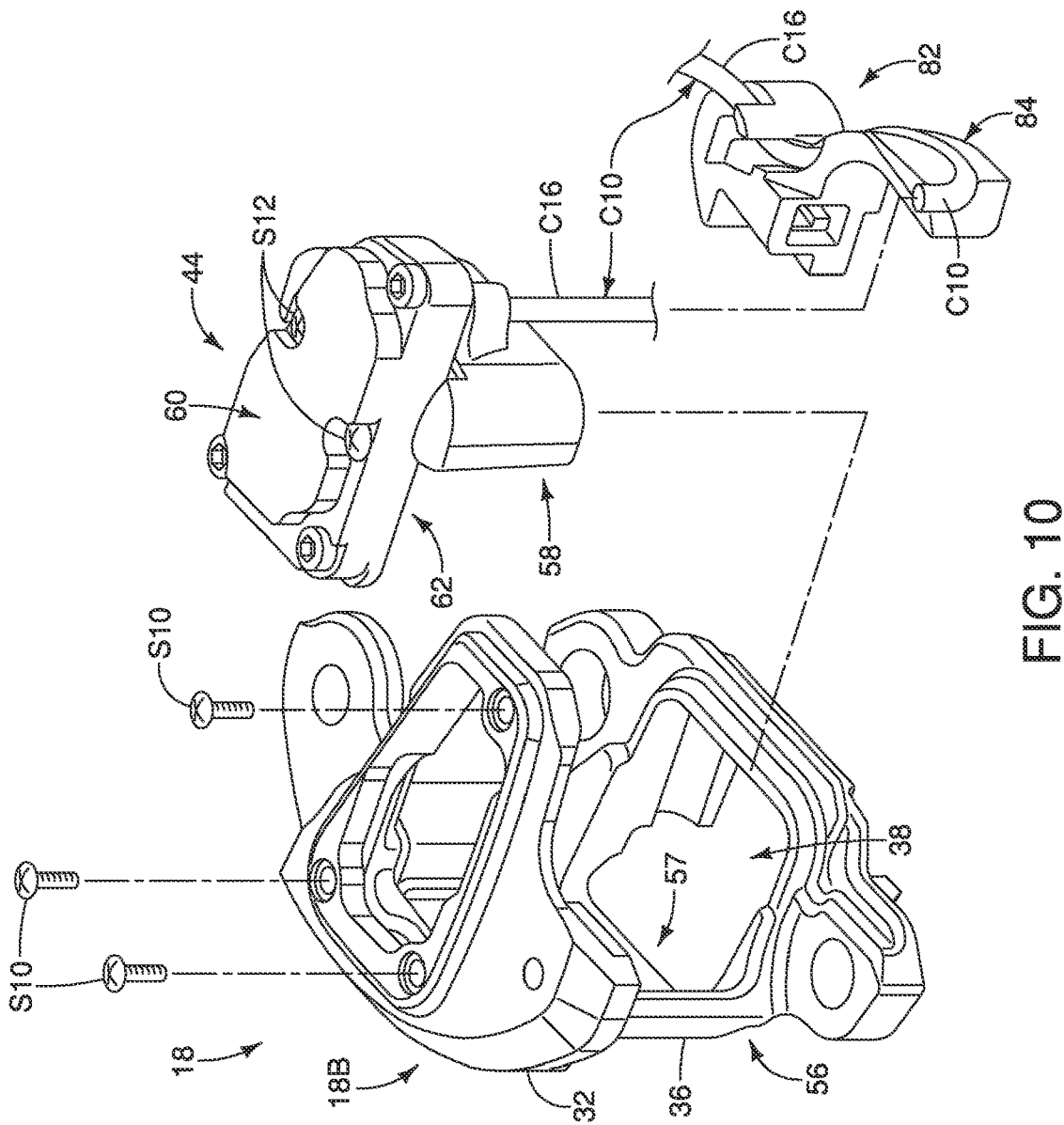
FIG. 10 is an exploded view of the outer link, illustrating arrangements of an outer link body, the power source connecting portion and a cable holder of the outer link.

Referring now to FIGS. 10 to 14, the configuration of the power source connecting portion 44 will be further described in detail. In the illustrated embodiment, the power source connecting portion 44 is attached to the link member 18. Specifically, the power source connecting portion 44 is attached to the outer link 18B. More specifically, in the illustrated embodiment, as seen in FIG. 10, the power source connecting portion 44 is fixedly attached to the outer link body 32 of the outer link 18B with fasteners S10, such as screws. The power source connecting portion 44 at least partially defines the power source accommodating space 38. Thus, the power source connecting portion 44 is also provided to hold the power source PS within the power source accommodating space 38 and to guide the power source PS in a state where the power source PS is installed to the derailleur 10.

Figure 11:
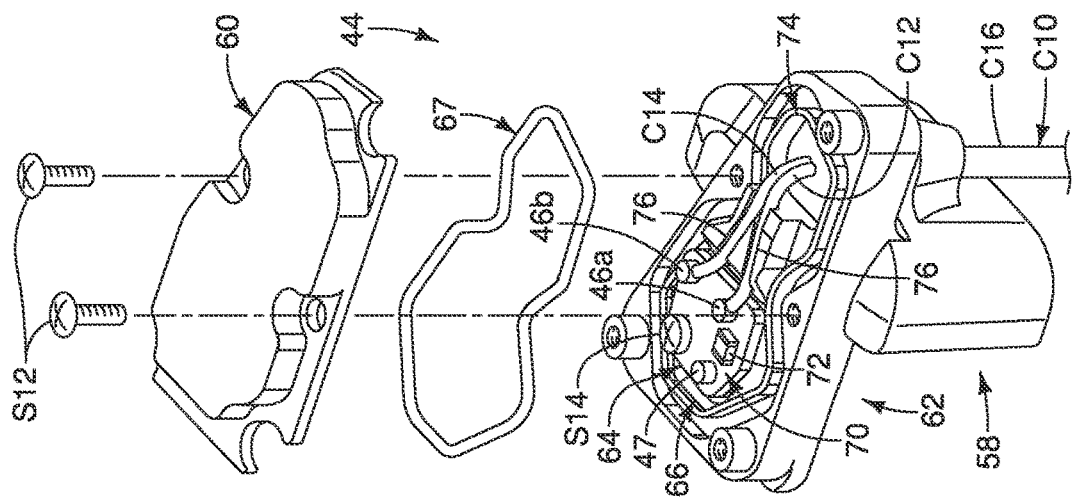
FIG. 11 is an exploded view of the power source connecting portion, illustrating an attachment of a cover relative to a connector base.

The power source connecting portion 44 mainly includes a connector base 58, a cover 60 and a terminal unit 62. The power source connecting portion 44 further includes a substrate 64. The connector base 58 is fixedly attached to the outer link body 32 with the fasteners S10. The cover 60 is fixedly attached to the connector base 58 with fasteners S12, such as screws. Specifically, in the illustrated embodiment, the cover 60 is attached to the connector base 58 to define an interior space 66 therebetween in which the substrate 64 is disposed. As seen in FIG. 11, the connector base 58 and the cover 60 are attached to each other with a seal member 67, such as an O-ring, being disposed therebetween to seal the interior space 66 in a watertight manner.

Figure 12:
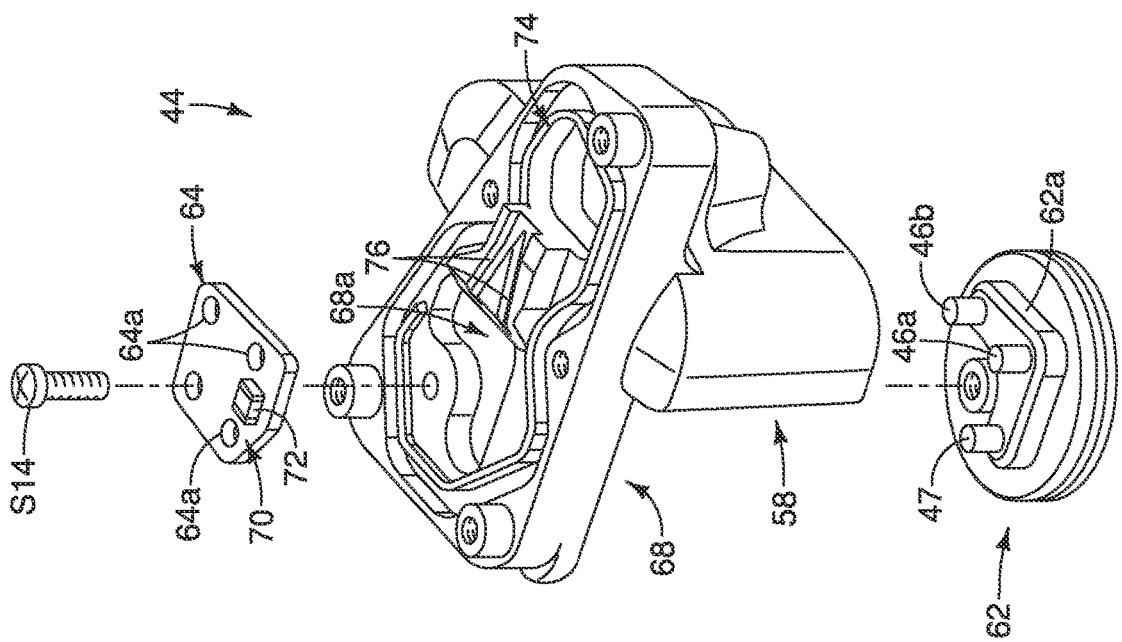
FIG. 12 is an exploded view of the power source connecting portion, illustrating an attachment of a substrate and a terminal unit relative to the connector base.

As seen in FIG. 12, the terminal unit 62 is fixedly attached to the connector base 58 with a fastener S14, such as a screw. In the illustrated embodiment, the substrate 64 is also fixedly attached to the connector base 58 with the same faster S14.

However, the terminal unit 62 and the substrate 64 are not limited to this configuration, and can be attached to the connector base 58 with different fasteners. In the illustrated embodiment, the terminal unit 62 is fitted to a receive portion 68 of the connector base 58 such that a support portion 62a of the terminal unit 62 is disposed through an aperture 68a of the receive portion 68. In the illustrated embodiment, the support portion 62a of the terminal unit 62 is made of a non-conductive material, such as plastic. The first and second terminals 46a and 46b and the first detection terminal 47 are provided to the support portion 62a of the terminal unit 62 such that the first and second terminals 46a and 46b and the first detection terminal 47 extend through the terminal unit 62 to protrude relative to the terminal unit 62 both toward the cover 60 and away from the cover 60. Thus, in a state where the terminal unit 62 is attached to the connector base 58, upper ends of the first and second terminals 46a and 46b and the first detection terminal 47, which are closer ends thereof to the cover 60, are disposed within the interior space 66 of the power source connecting portion 44. At the same time, lower ends of the first and second terminals 46a and 46b and the first detection terminal 47, which are farther ends thereof from the cover 60, are disposed within the power source accommodating space 38.

The substrate 64 includes through holes 64a through which the upper ends of the first and second terminals 46a and 46b and the first detection terminal 47 protrude above the substrate 64, respectively. In the illustrated embodiment, the first terminal 46a and the first detection terminal 47 are mounted to the substrate 64. In particular, the substrate 64 has one or more conducive patterns or traces on a surface of the substrate 64 and/or between insulating layers of the substrate 64. The conductive traces can be electrically connected to the first and second terminals 46a and 46b and the first detection terminal 47, if needed and/or desired. For example, the conductive traces can be electrically connected to the first and second terminals 46a and 46b and the first detection terminal 47 by soldering.

As well seen in FIG. 11, the power source connecting portion 44 further includes a bypass circuit 70 provided between the first terminal 46a and the first detection terminal 47. Specifically, the bypass circuit 70 includes a resistor 72. More specifically, the bypass circuit 70 includes the resistor 72 that is electrically connected between the first terminal 46a and the first detection terminal 47 via the conductive traces provided on the substrate 64.

In the illustrated embodiment, the power source connecting portion 44 is electrically connected to the actuator 20 via the electronic controller circuitry 22 using an electrical cable C10. In the illustrated embodiment, the electrical cable C10 is a jacketed multi-conductor (e.g., two-conductor) cable, for example. Thus, the electrical cable C10 at least includes a hot wire C12 and a neutral wire C14 that are wrapped by an outer jacket C16. In the illustrated embodiment, the hot wire C12 and the neutral wire C14 are electrically connected to the first and second terminals 46a and 46b, respectively. In particular, the hot wire C12 and the neutral wire C14 are joined to the upper ends of the first and second terminals 46a and 46b, respectively, by soldering, for example.

Figure 14:
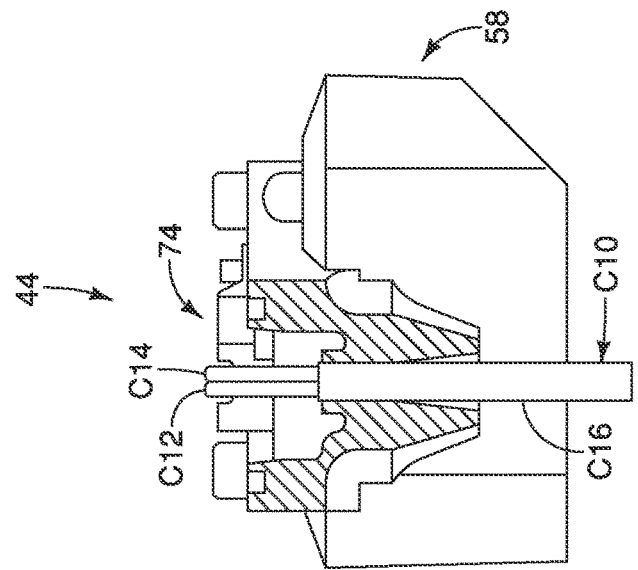
FIG. 14 is a cross-sectional view of the power source connecting portion, illustrating a connection of the electrical cable relative to the connector base.

In the illustrated embodiment, the electrical cable C10 extends outside from the power source connecting portion 44 through a cable receiving passageway 74 provided to the connector base 58. Thus, in the illustrated embodiment, the power source connecting portion 44 further includes the cable receiving passageway 74 for receiving the electrical cable C10 connecting the first terminal 46a to the actuator 20. Specifically, the cable receiving passageway 74 includes a through hole whose inner diameter is slightly smaller than or equal to an outer diameter of the electrical cable C10. Thus, as seen in FIG. 14, in a state where the electrical cable C10 is inserted through the cable receiving passageway 74, the outer jacket C16 is fastened by the cable receiving passageway 74 such that the electrical cable C10 is prevented from falling off of the power source connecting portion 44. Thus, even before the hot wire C12 and the neutral wire C14 are joined to the upper ends of the first and second terminals 46a and 46b, the electrical cable C10 can be securely held by the power source connecting portion 44.

The connector base 58 further includes a pair of cable grooves 76 for receiving the hot wire C12 and the neutral wire C14 within the interior space 66. Specifically, the cable grooves 76 extend from the cable receiving passageway 74 toward the upper ends of the first and second terminals 46a and 46b, respectively. Thus, the hot wire C12 and the neutral wire C14 can be easily guided to their soldered positions relative to the first and second terminals 46a and 46b by the cable grooves 76, respectively.

In the illustrated embodiment, once the electrical cable C10 is disposed through the cable receiving passageway 74, the electrical cable C10 can be fixedly coupled to the connector base 58. For example, the electrical cable C10 is fixedly coupled to the connector base 58 at the cable receiving passageway 74 with UV curing adhesives, for example.

Figure 13:
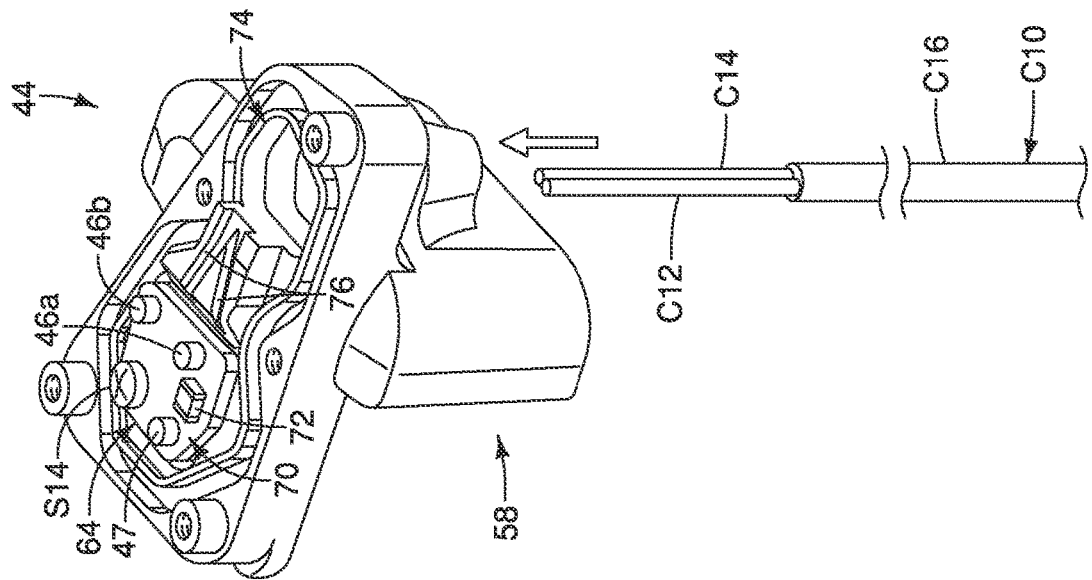
FIG. 13 is an exploded view of the power source connecting portion, illustrating an attachment of an electrical cable relative to the connector base.
Figure 16:
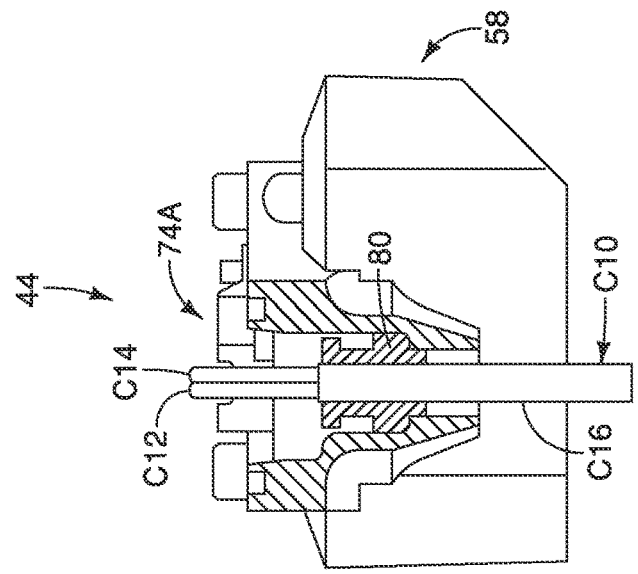
FIG. 16 is a cross-sectional view of the power source connecting portion in accordance with the modification shown in FIG. 15, illustrating a connection of the electrical cable relative to the connector base.
Figure 15:
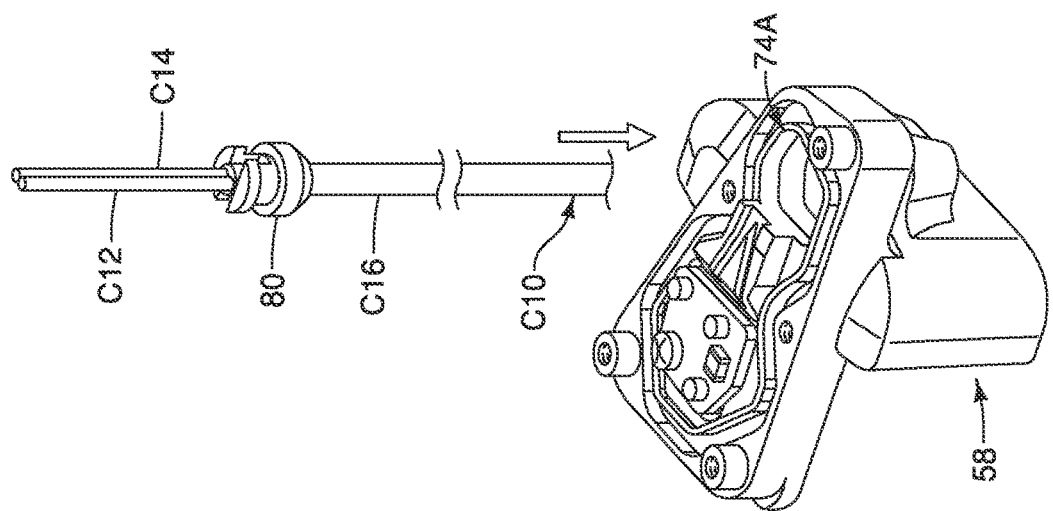
FIG. 15 is an exploded view of a power source connecting portion in accordance with a modification, illustrating an attachment of an electrical cable relative to a connector base.

In the illustrated embodiment, an example is illustrated in which the connector base 58 includes the cable receiving passageway 74 that is dimensioned to directly secure a portion of the electrical cable C10, as seen in FIGS. 13 and 14. However, the connector base 58 is not limited to this configuration. As seen in FIGS. 15 and 16, the connector base 58 can include a cable receiving passageway 74A for receiving the electrical cable C10. Specifically, the cable receiving passageway 74A includes a through hole whose inner diameter is larger than the outer diameter of the electrical cable C10. In this case, a tubular seal 80 is disposed to seal a radial gap between the electrical cable C10 and the cable receiving passageway 74A in a watertight manner. The tubular seal 80 is made of an elastic material, such as rubber, for example. Of course, the tubular seal 80 can be alternatively or additionally utilized to fix the electrical cable C10 to the connector base 58 shown in FIGS. 13 and 14. Similarly, the UV curing adhesives can be alternatively or additional utilized to fix the electrical cable C10 to the connector base 58 shown in FIGS. 15 and 16. Thus, in the illustrated embodiment, the electrical cable C10 can be fixedly coupled to the connector base 58 at the cable receiving passageway 74 or 74A with at least one of the UV curing adhesives and the tubular seal 80, for example.

In the illustrated embodiment, as seen in FIGS. 6 to 8 and 10, the derailleur 10 further includes a cable holder 82. Thus, in the illustrated embodiment, the component 10 further comprises the cable holder 82. The cable holder 82 is fixedly attached to the outer link body 32. Specifically, as seen in FIG. 10, the cable holder 82 has a cable groove 84 for receiving the electrical cable C10. The cable holder 82 is provided to hold the electrical cable C10 that extends out from the power source connecting portion 44 and to guide the electrical cable C10 between the power source connecting portion 44 and the actuator 20. Thus, in the illustrated embodiment, the cable holder 82 is configured to hold a portion of the electrical cable C10 connecting the first terminal 46a to the actuator 20. The cable groove 84 is dimensioned to have an inner diameter that is slightly smaller than or equal to the outer diameter of the electrical cable C10. Thus, in a state where the electrical cable C10 is received in the cable groove 84, the electrical cable C10 is prevented from falling off of the cable holder 82. Therefore, even before the hot wire C12 and the neutral wire C14 are joined to the upper ends of the first and second terminals 46a and 46b, the electrical cable C10 can be securely held by the cable holder 82. In the illustrated embodiment, the cable holder 82 is attached to the outer link body 32 such that the cable holder 82 at least partially defines the power source accommodating space 38. Thus, the cable holder 82 is also provided to hold the power source PS within the power source accommodating space 38 and to guide the power source PS in a state where the power source PS is installed to the derailleur 10. In some embodiments, the cable holder 82 can have a biasing member for biasing the power source PS to secure the power source PS within the power source accommodating space 38, if needed and/or desired.

Referring now to FIGS. 17 to 20, the configurations and the arrangements of the first and second terminals 46a and 46b and the first detection terminal 47 will be further described in detail. In the illustrated embodiment, the first terminal 46a and the first detection terminal 47 are spring loaded terminal pins, respectively. The second terminal 46b is a spring loaded terminal pin.

Figure 17:
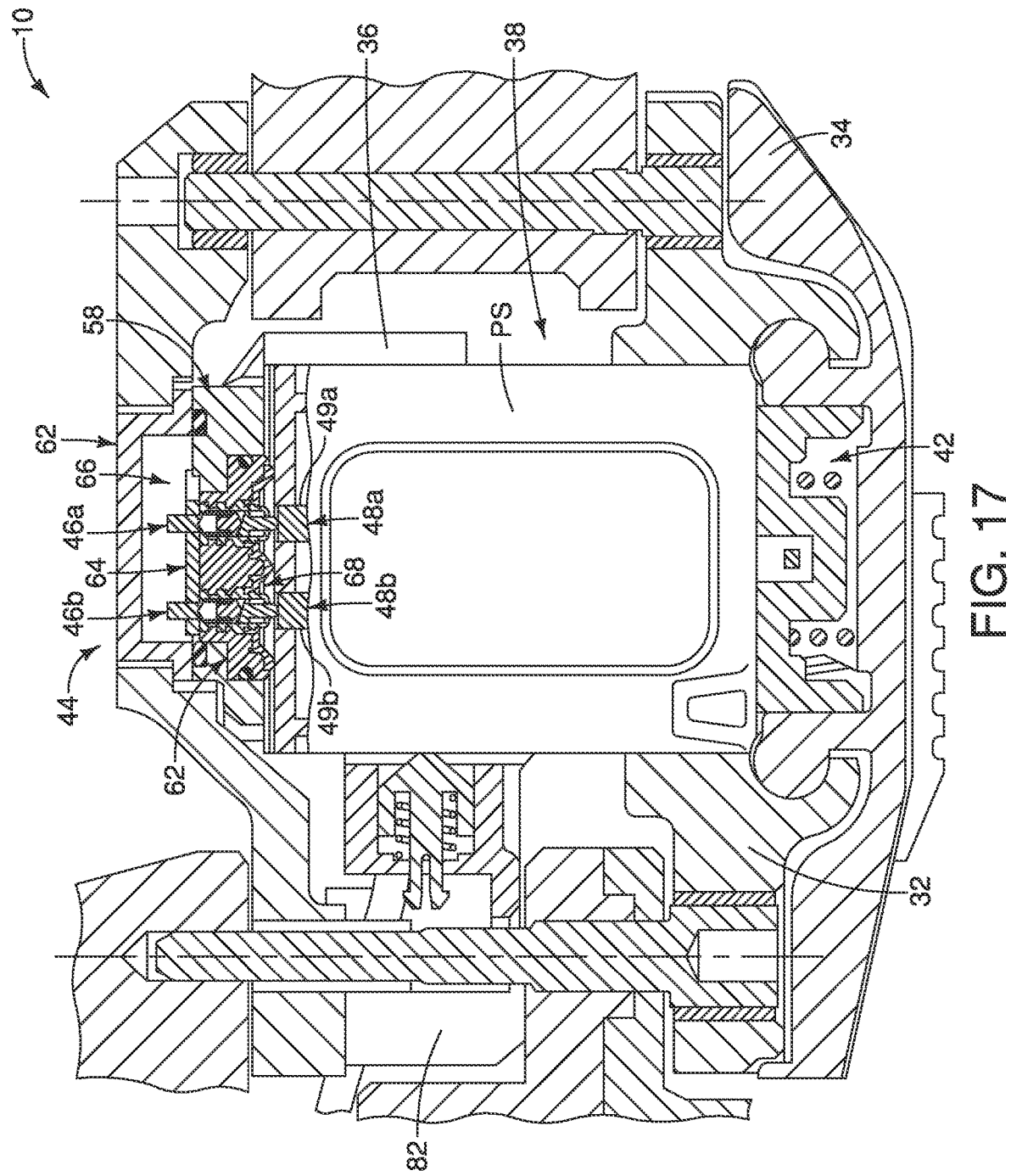
FIG. 17 is a cross-sectional view of the outer link of the derailleur, taken along a sectional plane including center axes of first and second terminals of the power source connecting portion of the derailleur.
Figure 18:
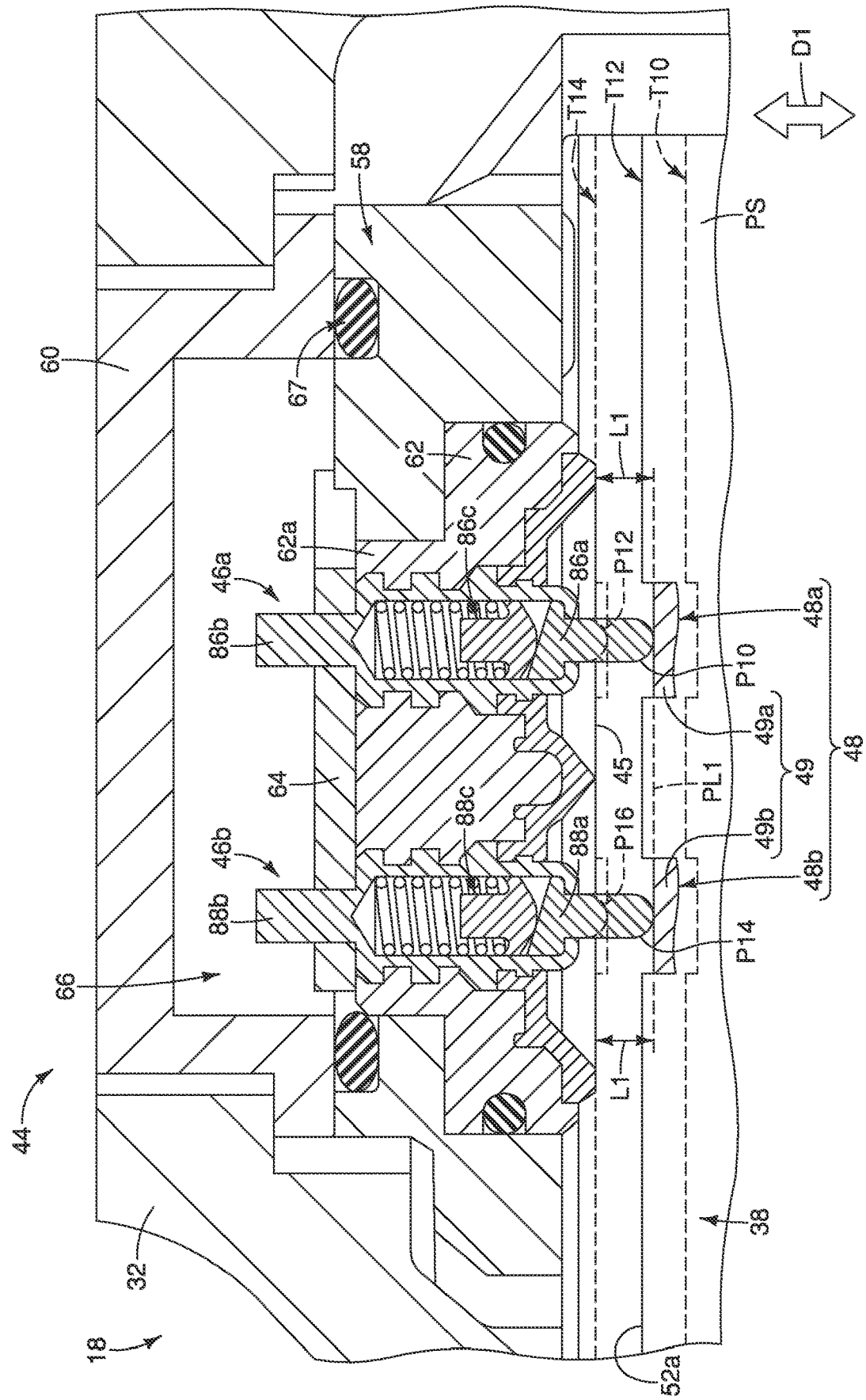
FIG. 18 is an enlarged cross-sectional view of the outer link of the derailleur shown in FIG. 17, illustrating the first and second terminals of the power source connecting portion of the derailleur.

More specifically, as seen in FIGS. 17 and 18, the first terminal 46a has a first contact portion 86a. The first terminal 46a also has a first electrode body 86b and a first biasing mechanism 86c. The first contact portion 86a forms the lower end of the first terminal 46a. The first contact portion 86a is configured to directly contact to the power supply terminal 48. In particular, the first contact portion 86a directly contacts to the first power contact portion 49a of the first power supply terminal 48a of the power source PS in a state where the power source PS is installed to the derailleur 10. As seen in FIG. 18, the first contact portion 86a is movably disposed within a hollow interior of the first electrode body 86b between an extended position P10 shown with a solid line and a contracted position P12 shown with a dotted line. The first electrode body 86b is fixedly attached or embedded to the support portion 62a of the terminal unit 62. Specifically, the first electrode body 86b extends through the terminal unit 62. The first electrode body 86b protrudes upward from the support portion 62a to form the upper end of the first terminal 46a that is joined to the hot wire C12 and the bypass circuit 70 on the substrate 64 by soldering. In the illustrated embodiment, the first contact portion 86a and the first electrode body 86b are made of conductive or metallic materials. While the first contact portion 86a moves relative to the first electrode body 86b between the extended position P10 and the contracted position P12, the first contact portion 86a and the first electrode body 86b maintain an electrical contact therebetween. In the illustrated embodiment, the first contact portion 86a is biased toward the extended position P10 by the first biasing mechanism 86c. The first biasing mechanism 86c includes a biasing member, such as a coil spring, and a biasing head attached to the first biasing member. Thus, the first contact portion 86a is located at the extended position P10 while the power source PS is detached from the derailleur 10.

In particular, as seen in FIG. 18, the first contact portion 86a is located at the extended position P10 in a disconnection state T10 where the power source PS is not connected to the power source connecting portion 44. On the other hand, at a timing while the power source PS is moved toward the attachment surface 45 from the position of the power source PS in the disconnection state T10, the first contact portion 86a contacts the first power contact portion 49a of the first power supply terminal 48a of the power source PS. The first contact portion 86a is pushed back toward the contracted position P12 by the first power contact portion 49a of the first power supply terminal 48a of the power source PS in a contact state T12 where the first contact portion 86a contacts the first power contact portion 49a of the first power supply terminal 48a of the power source PS. The power source PS is not attached to the attachment surface 45 in the contact state T12. The first contact portion 86a contacts to the first power contact portion 49a of the first power supply terminal 48a of the power source PS in the connection state T14 where the power source PS is attached to the attachment surface 45 (also shown in FIG. 17). Thus, the power source PS is connected to the power source connecting portion 44 in the connection state T14. The first contact portion 86a can securely contact to the first power contact portion 49a by a biasing force from the first biasing mechanism 86c in the connection state T14.

In the illustrated embodiment, the second terminal 46b is substantially identical to the first terminal 46a, and thus detailed descriptions of the second terminal 46b will be omitted for the sake of the brevity. Specifically, the second terminal 46b has a second contact portion 88a, a second electrode body 86b and a second biasing mechanism 86c that are substantially identical to the first contact portion 86a, the first electrode body 86b and the first biasing mechanism 86c, respectively. The second contact portion 88a forms the lower end of the second terminal 46b. The second contact portion 88a is configured to directly contact to the power supply terminal 48. In particular, the second contact portion 88a directly contacts to the second power contact portion 49b of the second power supply terminal 48b of the power source PS in a state where the power source PS is installed to the derailleur 10. As seen in FIG. 18, the second contact portion 88a is movably disposed within a hollow interior of the second electrode body 88b between an extended position P14 shown with a solid line and a contracted position P16 shown with a dotted line. The second electrode body 88b protrudes upward from the support portion 62a to form the upper end of the second terminal 46b that is joined to the neutral wire C14 by soldering. In the illustrated embodiment, the second contact portion 88a and the second electrode body 88b are made of conductive or metallic materials. While the second contact portion 88a moves relative to the second electrode body 88b between the extended position P14 and the contracted position P16, the second contact portion 88a and the second electrode body 88b maintain an electrical contact therebetween. In the illustrated embodiment, the second contact portion 88a is biased toward the extended position P14 by the second biasing mechanism 88c. Thus, the second contact portion 88a is located at the extended position P14 while the power source PS is detached from the derailleur 10.

In particular, as seen in FIG. 18, the second contact portion 88a is located at the extended position P14 in the disconnection state T10. On the other hand, at a timing while the power source PS is moved toward the attachment surface 45 from the position of the power source PS in the disconnection state T10, the second contact portion 88a also touches the second power contact portion 49b of the second power supply terminal 48b of the power source PS. The second contact portion 88a is pushed back toward the contracted position P16 by the second power contact portion 49b of the second power supply terminal 48b of the power source PS in the contact state T12. The second contact portion 88a contacts to the second power contact portion 49b of the second power supply terminal 48b of the power source PS in the connection state 14. The second contact portion 88a can securely contact to the second power contact portion 49b by a biasing force from the second biasing mechanism 88c.

In the illustrated embodiment, as seen in FIG. 18, the first terminal 46a and the second terminal 46b protrude from the attachment surface 45 of the power source connecting portion 44. The attachment surface 45 forms a closed upper end of the power source accommodating space 38 of the power source receiving portion 36. Specifically, the first terminal 46a has a first length L1 extending from the attachment surface 45 to the first contact portion 86a in the disconnection state T10. In other words, the first terminal 46a has the first length L1 extending from the attachment surface 45 to the first contact portion 86a in a state where the first contact portion 86a is located at the extended position P10. In the illustrated embodiment, the second terminal 46b is substantially identical to the first terminal 46a, and thus also has the first length L1 extending from the attachment surface 45 to the second contact portion 88a in the disconnection state T10. Furthermore, in the illustrated embodiment, as seen in FIG. 18, the power contact portions 49 (i.e., the first and second power contact portions 49a and 49b) of the power source PS are located on a first plane PL1 in the attachment direction D1 of the power source PS for connecting the power supply terminals 48 (i.e., the first and second power supply terminals 48a and 48b) to the first and second terminals 46a and 46b. Thus, in the illustrated embodiment, the first and second contact portions 86a and 88a of the first and second terminals 46a and 46b simultaneously contact to the first and second power contact portions 49a and 49b of the power source PS in the contact state T12 during connecting operation of the power source PS to the power source connecting portion 44. Of course, the first and second terminals 46a and 46b are not limited to this, and can have different lengths extending from the attachment surface 45 to the first and second contact portions 86a and 88a in the disconnection state T10, respectively. In this case, the power contact portions 49 (i.e., the first and second power contact portions 49a and 49b) of the power source PS can be located on different planes in the attachment direction D1 of the power source PS such that the first and second contact portions 86a and 88a of the first and second terminals 46a and 46b simultaneously contact to the first and second power contact portions 49a and 49b of the power source PS during the connecting operation of the power source PS to the power source connecting portion 44.

Figure 19:
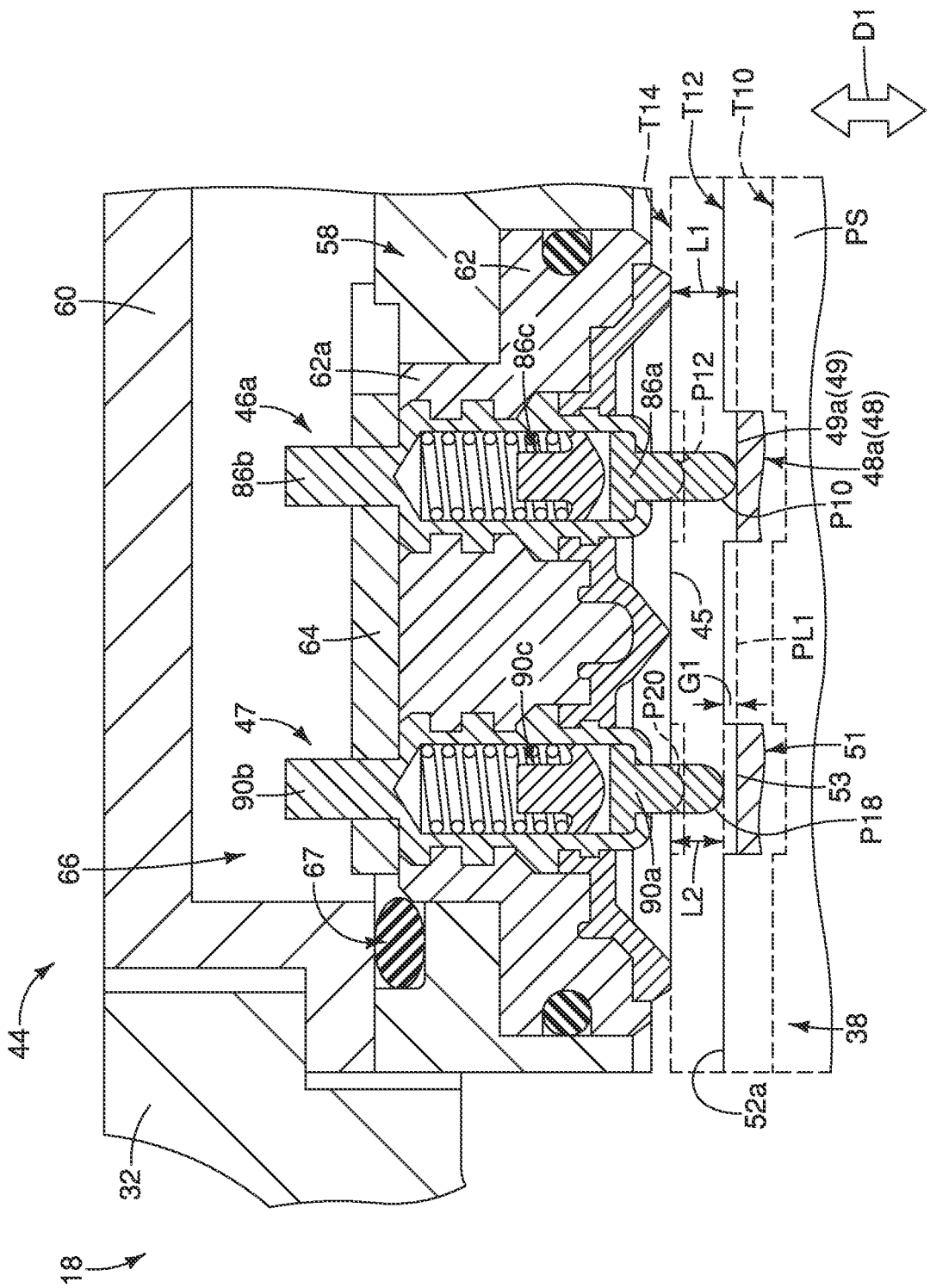
FIG. 19 is an enlarged cross-sectional view of the outer link of the derailleur, taken along a sectional plane including center axes of the first terminal and a first detection terminal of the power source connecting portion of the derailleur.

Furthermore, as seen in FIG. 19, the first detection terminal 47 has a first detection contact portion 90a. The first detection terminal 47 also has a first detection electrode body 90b and a first detection biasing mechanism 90c. The first detection contact portion 90a forms the lower end of the first detection terminal 47. The first detection contact portion 90a is configured to directly contact to the second detection terminal 51. In particular, the first detection contact portion 90a directly contacts to the second detection contact portion 53 of the second detection terminal 51 of the power source PS in a state where the power source PS is installed to the derailleur 10. As seen in FIG. 19, the first detection contact portion 90a is movably disposed within a hollow interior of the first detection electrode body 90b between an extended position P18 shown with a solid line and a contracted position P20 shown with a dotted line. The first detection electrode body 90b is fixedly attached or embedded to the support portion 62a of the terminal unit 62. Specifically, the first detection electrode body 90b extends through the terminal unit 62. The first detection electrode body 90b protrudes upward from the support portion 62a to form the upper end of the first detection terminal 47 that is joined to the bypass circuit 70 on the substrate 64 by soldering. In the illustrated embodiment, the first detection contact portion 90a and the first detection electrode body 90b are made of conductive or metallic materials. While the first detection contact portion 90a moves relative to the first detection electrode body 90b between the extended position P18 and the contracted position P20, the first detection contact portion 90a and the first detection electrode body 90b maintain an electrical contact therebetween. In the illustrated embodiment, the first detection contact portion 90a is biased toward the extended position P18 by the first detection biasing mechanism 90c. The first detection biasing mechanism 90c includes a biasing member, such as a coil spring, and a biasing head attached to the biasing member. Thus, the first detection contact portion 90a is located at the extended position P18 while the power source PS is detached from the derailleur 10.

Figure 20:
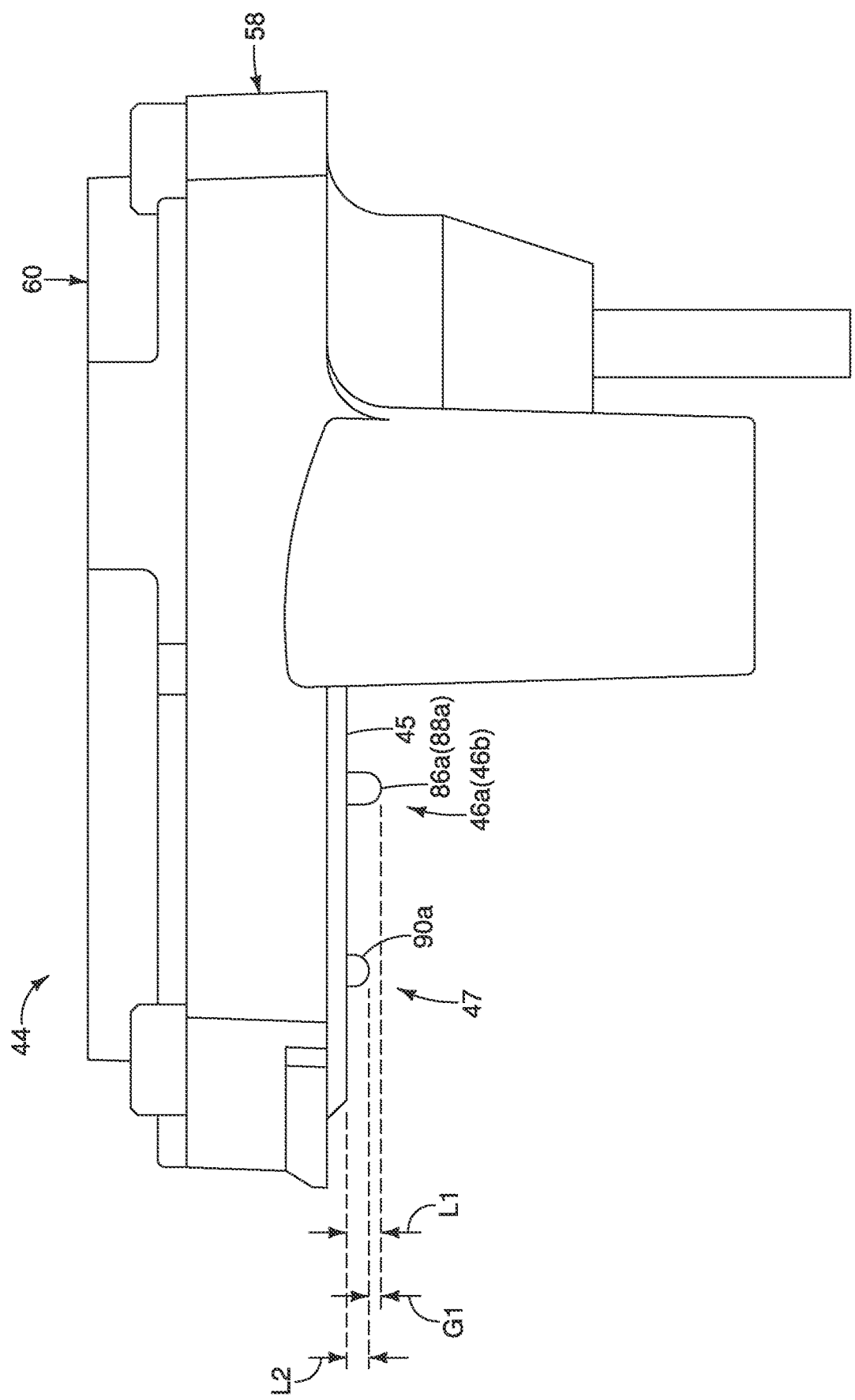
FIG. 20 is a side view of the power source connecting portion of the derailleur, illustrating the first terminal (the second terminal) and the first detection terminal of the power source connecting portion of the derailleur.

As seen in FIGS. 19 and 20, the first terminal 46a and the first detection terminal 47 protrude from the attachment surface 45. Specifically, the first contact portion 86a is located at the extended position P10 in the disconnection state T10, while the first detection contact portion 90a is located at the extended position P18. In the illustrated embodiment, the first terminal 46a has the first length L1 in a state where the first contact portion 86a is located at the extended position P10, as mentioned above. On the other hand, the first detection terminal 47 has a second length L2 extending from the attachment surface 45 to the first detection contact portion 90a. In particular, the first detection terminal 47 has the second length L2 in a state where the first detection contact portion 90a is located at the extended position P18. Furthermore, as seen in FIGS. 19 and 20, the first length L1 is larger than the second length L2 in the disconnection state T10. Thus, the first detection contact portion 90a is closer to the attachment surface 45 than the first contact portion 86a in the disconnection state T10 where the power source PS is not connected to the power source connecting portion 44. In particular, in the illustrated embodiment, the first contact portion 86a is located closer to the insertion opening 40 of the power source accommodating space 38 than the first detection contact portion 90a in the disconnection state T10.

Furthermore, the first contact portion 86a touches the first power contact portion 49a of the first power supply terminal 48a of the power source PS in the contact state T12. On the other hand, the first detection contact portion 90a has not touched the second detection contact portion 53 of the second detection terminal 51 of the power source PS and is located at the extended position P18 in the contact state T12, due to the difference between the first length L1 and the second length L2. Thus, the first detection terminal 47 is configured to be no contact with the second detection terminal 51 with a gap G1 between the first detection terminal 47 and the second detection terminal 51 at a timing when the first terminal 46a contacts to the power supply terminal 48 during connecting operation of the power source PS to the power source connecting portion 44.

the power source PS is further inserted into the power source accommodating space 38 by a distance equal to the gap G1 from the position of the power source PS in the contact state T12 so that the first detection contact portion 90a finally touches the second detection contact portion 53 of the second detection terminal 51 of the power source PS. Thus, the first detection terminal 47 is configured to contact to the second detection terminal 51 after the first terminal 46a contacts to the power supply terminal 48 during the connecting operation of the power source PS to the power source connecting portion 44. Then, while the power source PS is further moved toward from the position of the power source PS between the contact state T12 and the connection state T14, the first detection contact portion 90a is pushed back toward the contracted position P20 by the second detection contact portion 53 of the second detection terminal 51 of the power source PS. Thus, the first detection contact portion 90a contacts to the second detection contact portion 53 of the second detection terminal 51 of the power source PS in the connection state T14. The first detection contact portion 90a can securely contact to the second detection contact portion 53 by a biasing force from the first detection biasing mechanism 86c in the connection state T14.

Figure 21:
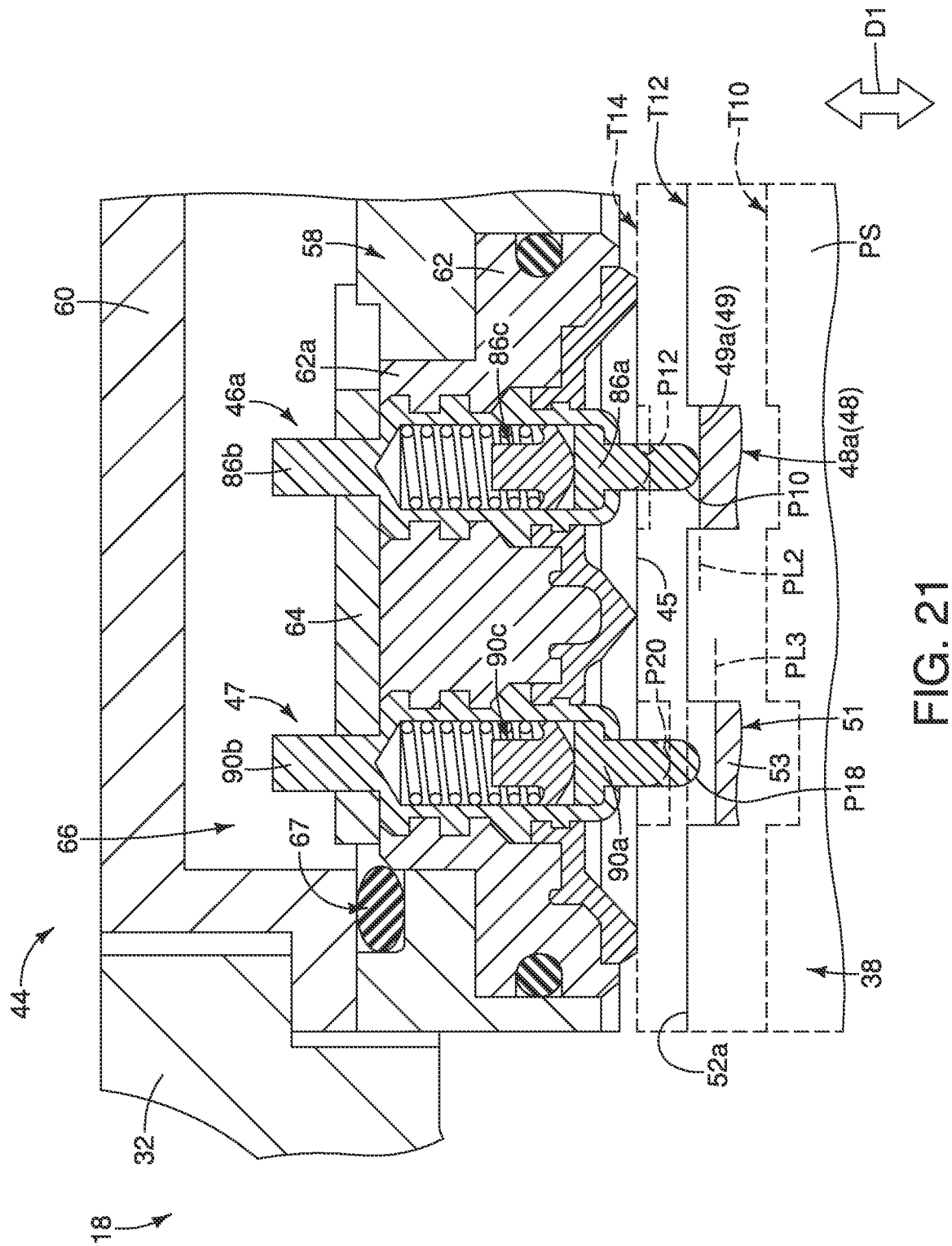
FIG. 21 is an enlarged cross-sectional view illustrating a first terminal and a first detection terminal in accordance with a modification.

In the illustrated embodiment, as seen in FIG. 19, the first terminal 46a has the first length L1 in a state where the first contact portion 86a is located at the extended position P10, while the first detection terminal 47 has the second length L2 that is shorter than the first length L1 in a state where the first detection contact portion 90a is located at the extended position P18. Furthermore, the power contact portion 49 and the second detection contact portion 53 are located on a first plane PL1 in the attachment direction D1 of the power source PS for connecting the power supply terminal 48 to the first terminal 46a and the second detection terminal 51 to the first detection terminal 47. In particular, as seen in FIG. 19, the first power contact portion 49a and the second detection contact portion 53 are located on the first plane PL1. Thus, as mentioned above, the first detection terminal 47 is configured to contact to the second detection terminal 51 after the first terminal 46a contacts to the power supply terminal 48 during the connecting operation of the power source PS to the derailleur 10. However, of course, the first terminal 46a and the first detection terminal 47 are not limited to this, and can have the same length in the disconnection state T10. In this case, as seen in FIG. 21, the power contact portion 49 can be located on a second plane PL2 in the contact state T12. The second detection contact portion 53 can be located on a third plane PL3 in the contact state T12. In the illustrated embodiment, the second plane PL2 is different from the third plane PL3. The second plane PL2 is offset from the third plane PL3 in the attachment direction D1 of the power source PS. With this configuration, the first detection terminal 47 is configured to contact to the second detection terminal 51 after the first terminal 46a contacts to the power supply terminal 48 during the connecting operation of the power source PS to the power source connecting portion 44. Specifically, in this case, the power contact portion 49 (i.e., the second plane PL2) is located closer to the top surface 52a of the power source PS than the second detection contact portion 53 (i.e., the third plane PL3) is, as seen in FIG. 21.

Figure 22:
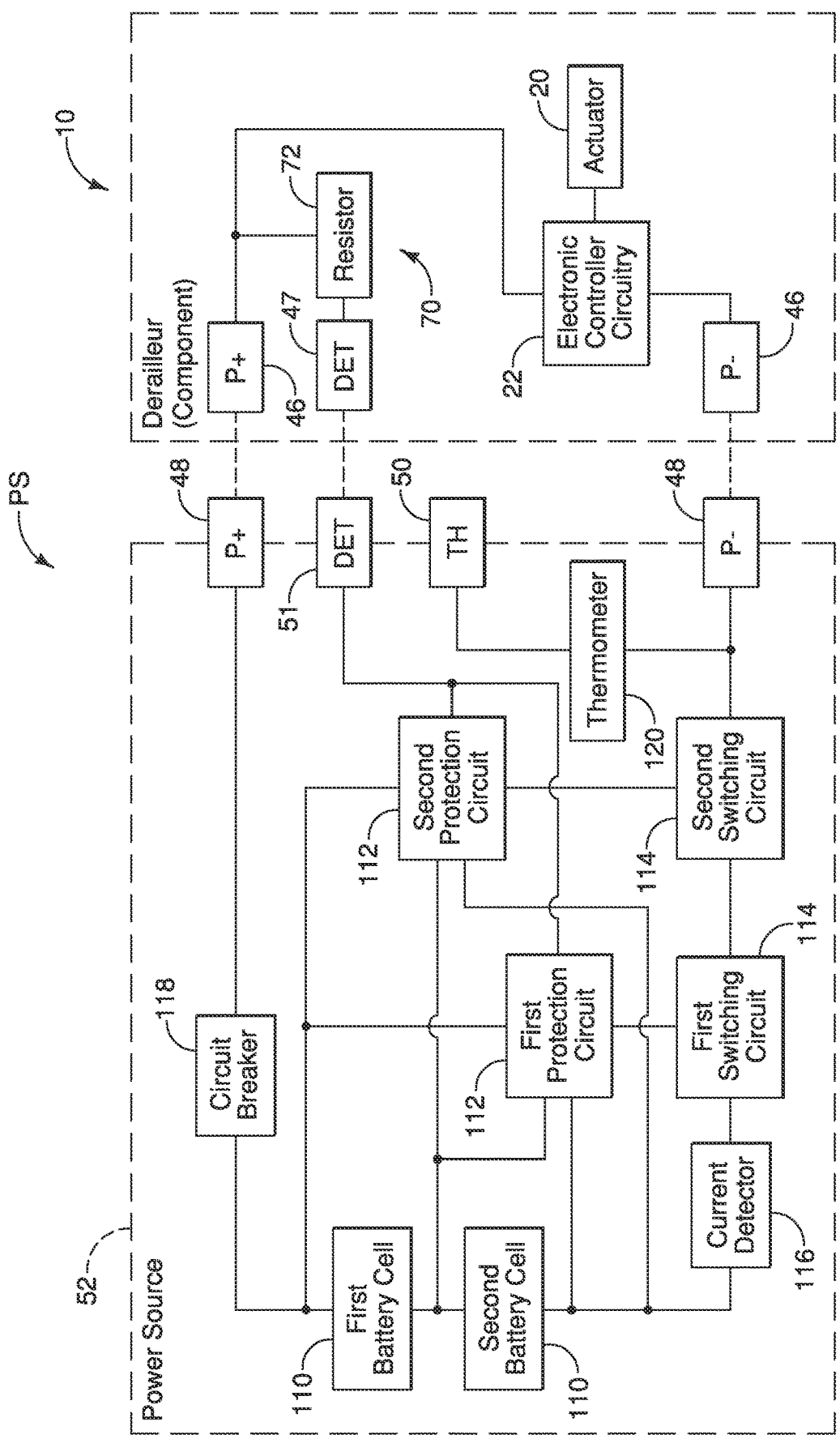
FIG. 22 is a simplified block diagram of the power source, showing an electrical connection to the derailleur.
Figure 23:
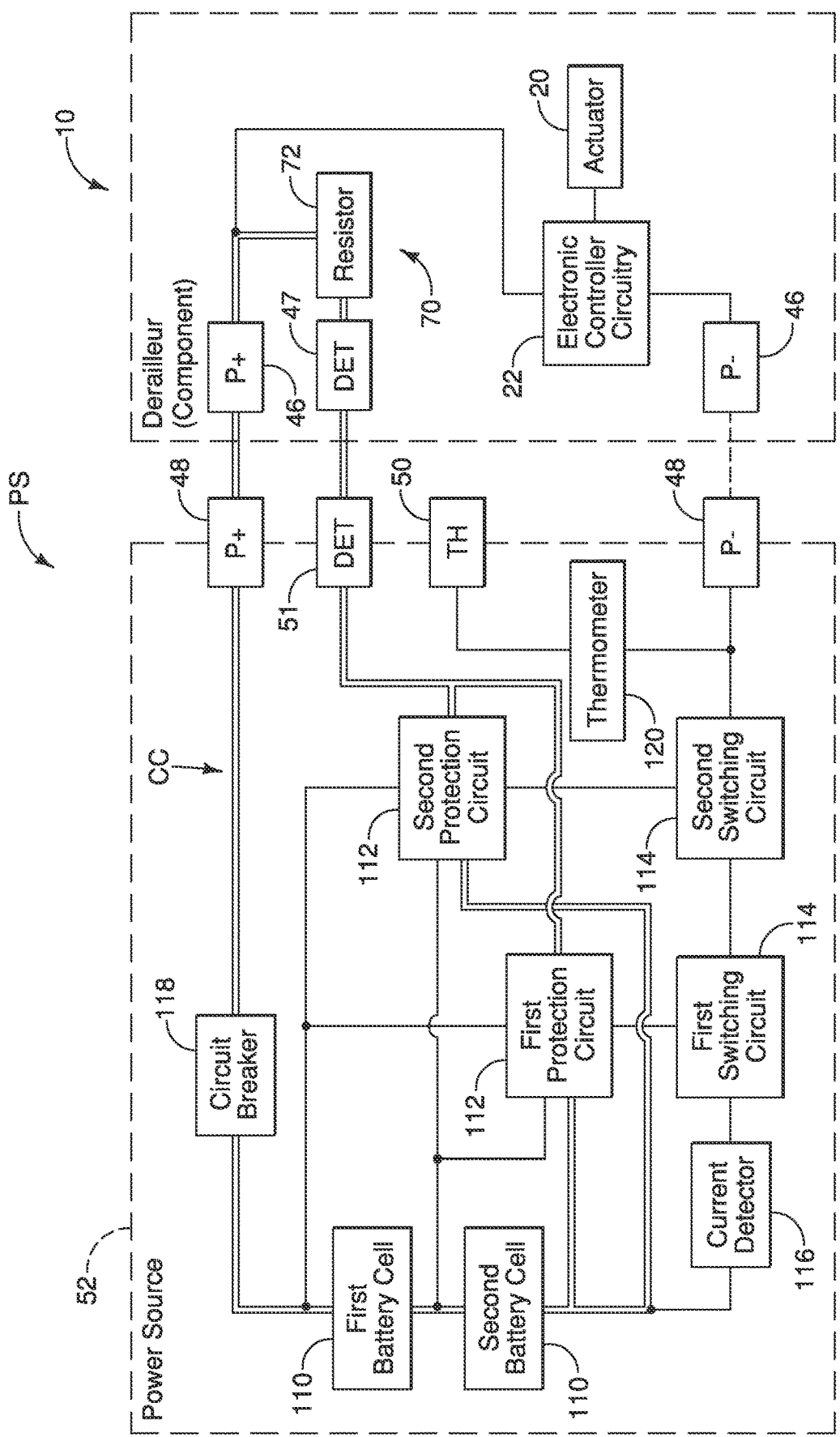
FIG. 23 is a simplified block diagram of the power source, showing a closed electrical circuit established between the power source and the derailleur via a bypass circuit.
Figure 24:
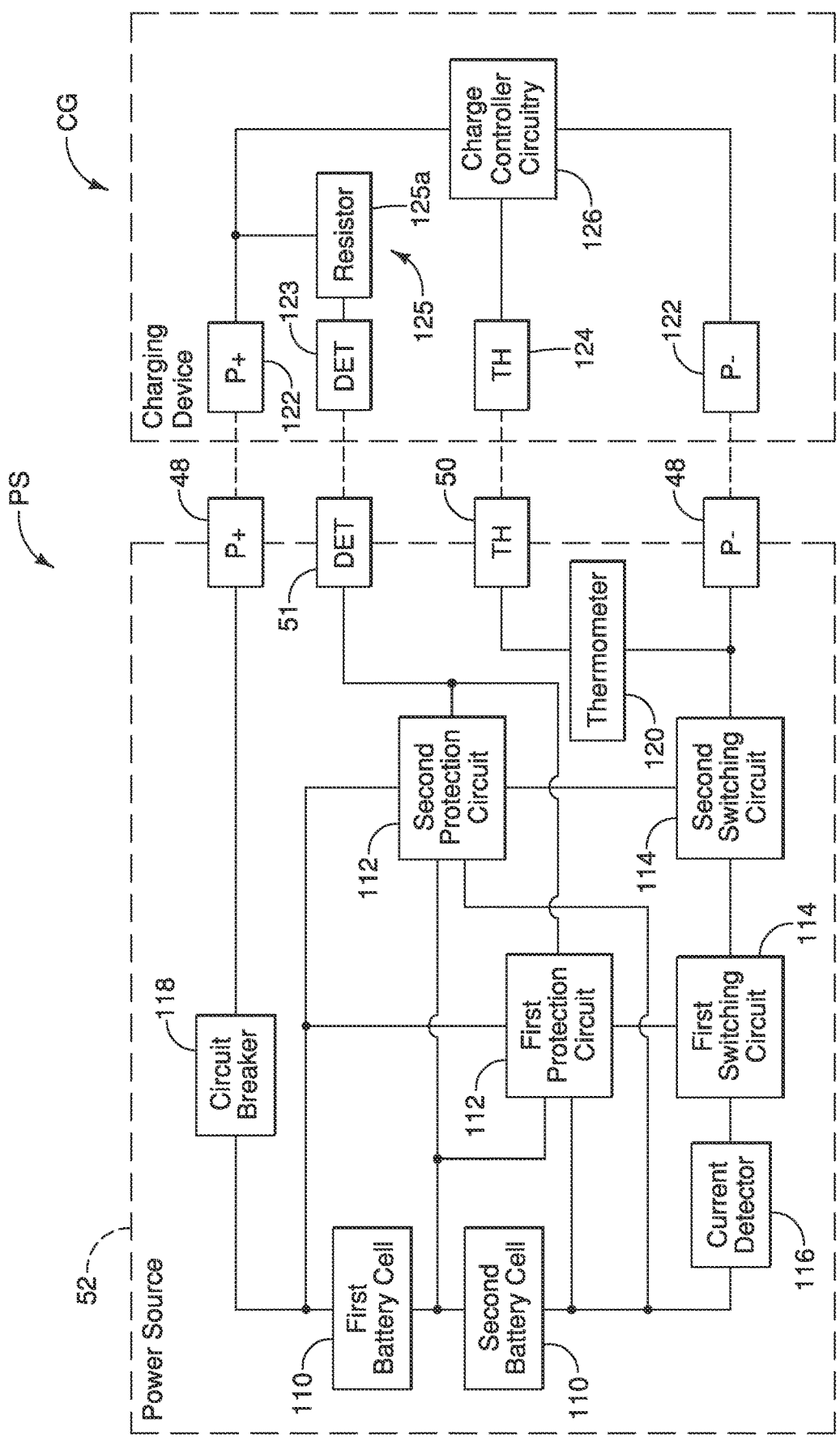
FIG. 24 is a simplified block diagram of the power source, showing an electrical connection to a charging device.

Referring now to FIGS. 22 to 24, electrical configurations of the power source PS will be discussed in more detail. As seen in FIGS. 22 to 24, the power source PS includes one or more battery cells 110, one or more protection circuits 112, one or more switching circuits 114, a current detector 116, a circuit breaker 118, and a thermometer 120.

In the illustrated embodiment, the battery cells 110 includes two battery cells (i.e., first and second battery cells). However, the battery cells 110 are not limited to this number, and can only include a single battery cell or more than two battery cells. The battery cells 110 are accommodated within the power source housing 52 by mold so as not to be removed from the power source housing 52. The protection circuits 112 includes two protection circuits (i.e., first and second protection circuits), such as protection ICs. The first and second protection circuits 112 are functionally identical to each other, and are duplicated for a backup in case one of them fails. Similarly, the switching circuits 114 includes two switching circuits (i.e., first and second switching circuits 114). The first and second switching circuits 114 are functionally identical to each other, and are duplicated for a backup in case one of them fails. Typically, the first and second switching circuits 114 includes charge/discharge FETs each having a pair of power MOSFETs serially connected, back-to-back, to each other for charging and discharging, respectively. In the illustrated embodiment, the power MOSFETs are placed on the negative end of the power source PS. However, alternatively, the power MOSFETs can be placed on the positive end of the power source PS. Of course, the switching circuits 114 can include any type of electrical elements functionally equivalent to the charge/discharge FETs. The first and second protection circuits 112 are provided corresponding to the first and second switching circuits 114, respectively, to control the on and off of the power MOSFETs of the first and second switching circuits 114, respectively, for managing the charge and discharge of the power source PS. The current detector 116 is provided for measuring the current flowing through the first and second battery cells 110. In the illustrated embodiment, the current detector 116 includes a shunt resistor, for example. Of course, the current detector 116 can include any type of electrical elements functionally equivalent to the shunt resistor.

The first and second protection circuits 112 are electrically arranged relative to the first and second battery cells 110 to monitor the voltage of each of the first and second battery cells 110. The first and second protection circuits 112 are electrically arranged relative to the current detector 116 to monitor the voltage across the current detector 116 for measuring the current flowing through the first and second battery cells 110. With this configuration, the first and second protection circuits 112 detect operation status of the power source PS, and if the first and second protection circuits 112 detect irregularities, such as overcharge, overdischarge, overcurrent, short-circuit condition, etc., then the first and second protection circuits 112 control the on and off of the power MOSFETs of the first and second switching circuits 114, respectively, for addressing the irregularities.

Specifically, in the illustrated embodiment, each of the first and second protection circuits 112 have two thresholds for detecting the irregularities. One is for detecting the current leakage, while the other is for stopping the current when the current over an allowable current level of the first and second battery cells 110 flows. For example, the current over the allowable current level flows when the power supply terminals 48 of the power source PS contact to the metal or when an actuator with different rated or operating current is connected to the power source PS. The first and second protection circuits 112 automatically turn off the first and second switching circuits 114 if the measured current is over the thresholds for a predetermined time. Therefore, no microcomputer is needed because the first and second protection circuits 112 can automatically operate based on the thresholds and the predetermined time.

In the illustrated embodiment, the first and second protection circuits 112 are also electrically connected to the second detection terminal 51 to monitor a connection between the power source PS and the derailleur 10. In particular, during the connecting operation of the power source PS to the power source connecting portion 44, the second detection terminal 51 of the power source PS contacts to the first detection terminal 47 of the derailleur 10 after the power supply terminals 48 of the power source PS contact to the power terminals 46 of the derailleur 10. In a state where the second detection terminal 51 of the power source PS contacts to the first detection terminal 47 of the derailleur 10, a closed electrical circuit CC, shown by thick lines in FIG. 23, is established between the power source PS and the derailleur 10 via the bypass circuit 70. With this establishment of the closed electrical circuit CC, input voltages are applied at input terminals of the first and second protection circuits 112 that are connected to the second detection terminal 51. In a state where the input voltages are applied at the input terminals of the first and second protection circuits 112, the first and second protection circuits 112 turn on the first and second switching circuits 114, respectively, such that the supply current for driving the actuator 20 can be supplied from the power source PS to the derailleur 10 via the electrical connections between the power supply terminals 48 of the power source PS and the power terminals 46 of the derailleur 10.

As mentioned above, during the connecting operation of the power source PS to the power source connecting portion 44, the power supply terminals 48 of the power source PS contact to the power terminals 46 of the derailleur 10 before the second detection terminal 51 of the power source PS contacts to the first detection terminal 47 of the derailleur 10, as seen in FIG. 19. However, the supply current for driving the actuator 20 is prevented from being supplied until the first and second protection circuits 112 turn on the first and second switching circuits 114, respectively, in response to the second detection terminal 51 of the power source PS contacting to the first detection terminal 47 of the derailleur 10. Once the second detection terminal 51 of the power source PS is electrically connected to the first detection terminal 47 of the derailleur 10 and the first and second protection circuits 112 turn on the first and second switching circuits 114, then the supply current from the power source PS is supplied through the electrical connection between the power supply terminals 48 of the power source PS and the power terminals 46 of the derailleur 10. Thus, the first terminal 46a is configured to supply the supply current to the actuator 20 in a state where the first detection terminal 47 is configured to be electrically connected to the second detection terminal 51 of the power source PS. In the illustrated embodiment, the first and second protection circuits 112 serve as an electronic controller circuitry configured to control the supply current provided from the power source PS. Thus, in the illustrated embodiment, the first and second protection circuits 112 are also referred to as a second electronic controller circuitry 112. Therefore, in the illustrated embodiment, the power source PS includes the second electronic controller circuitry 112 configured to control the supply current in response to the contact between the first detection terminal 47 and the second detection terminal 51.

In the illustrated embodiment, the positive electrode of the first battery cell 110 is electrically connected to the positive power supply terminal 48 (i.e., the first power supply terminal 48a) via the circuit breaker 118. In the illustrated embodiment, the circuit breaker 118 includes a PCT device that includes a resistor with a positive temperature coefficient. The PCT device has a low resistance during normal operation status of the power source PS. If the temperature of the power source PS excessively rises, then the resistance of the PCT device increases accordingly to cut the positive power supply terminal 48 off from the first and second battery cells 110. Of course, the circuit breaker 118 can include any type of electrical elements functionally equivalent to the PCT device. The negative electrode of the second battery cell 110 is electrically connected to the negative power supply terminal 48 (i.e., the second power supply terminal 48b) via the current detector 116 and the first and second switching circuits 114.

Furthermore, in the illustrated embodiment, the thermometer 120 is electrically connected between the negative power supply terminal 48 and the thermal terminal 50. In the illustrated embodiment, the thermometer 120 includes a thermistor that includes a resistor whose resistance increases according to the temperature of the power source PS. Of course, the thermometer 120 can include any type of electrical elements functionally equivalent to the thermistor. In the illustrated embodiment, as seen in FIGS. 22 and 23, the power source connecting portion 44 does not include a terminal corresponding to the thermal terminal 50 of the power source PS. Thus, the thermal terminal 50 is not electrically coupled to the derailleur 10 in a state where the power source PS is installed to the derailleur 10.

On the other hand, as seen in FIG. 24, the charging device CG includes a current providing terminal with a pair of positive and negative power terminals 122, a third detection terminal 123 and a monitoring terminal 124. Similar to the first detection terminal 47 of the derailleur 10 shown in FIGS. 22 and 23, the third detection terminal 123 is electrically connected to the positive power terminal 122 via a bypass circuit 125 having a resistor 125a. The monitoring terminal 124 is electrically connected to a charge controller circuitry 126 of the charging device CG. In the illustrated embodiment, in a state where the power source PS is placed to the charging device CG for charging, the power source PS is electrically coupled to the charging device CG. In particular, in a state where the power source PS is placed to the charging device CG, the power supply terminals 48 of the power source PS contact to the power terminals 122 of the charging device CG, while the second detection terminal 51 of the power source PS contacts to the third detection terminal 123 of the charging device CG. In a state where the second detection terminal 51 of the power source PS contacts to the third detection terminal 123 of the charging device CG, a closed electrical circuit is established between the power source PS and the charging device CG via the bypass circuit 125. With this establishment of the closed electrical circuit, input voltages are applied at the input terminals of the first and second protection circuits 112 that are connected to the second detection terminal 51. In a state where the input voltages are applied at the input terminals of the first and second protection circuits 112, the first and second protection circuits 112 turn on the first and second switching circuits 114, respectively, to allow charge current from the charging device CG for charging the battery cells 110 to be supplied from the charging device CG to the power source PS via the electrical connections between the power supply terminals 48 of the power source PS and the power terminals 122 of the charging device CG. Here, in the illustrated embodiment, the power terminals 122 and the third detection terminal 123 of the charging device CG can have similar configurations to the power terminals 46 and the first detection terminal 47 of the derailleur 10 shown in FIGS. 18 and 19. In particular, the power terminals 122 and the third detection terminal 123 of the charging device CG can be configured such that the third detection terminal 123 is configured to contact to the second detection terminal 51 after the power terminals 46 contact to the power supply terminals 48 during connecting operation of the power source PS to the charging device CG.

In the illustrated embodiment, the thermal terminal 50 is configured to be electrically connected to the monitoring terminal 124 of the charging device CG such that the charging device CG monitors information related to the temperature of the power source PS. In the illustrated embodiment, during a charging process, the charge controller circuitry 126 monitors the resistance of the thermometer 120 through the monitoring terminal 124 that is connected to the thermal terminal 50 of the power source PS. The charge controller circuitry 126 stops charging of the power source PS once the resistance of the thermometer 120 exceeds a predetermined threshold. This is because this excess means that the temperature of the power source PS has risen excessively. In the illustrated embodiment, the charge controller circuitry 126 of the charging device CG monitors the resistance of the thermometer 120 as the information related to the temperature of the power source PS. Of course, the charge controller circuitry 126 can use the resistance of the thermometer 120 to calculate the temperature of the power source PS. Furthermore, the charge controller circuitry 126 can retrieve any other information related to the temperature of the power source PS from the power source PS.

Figure 25:
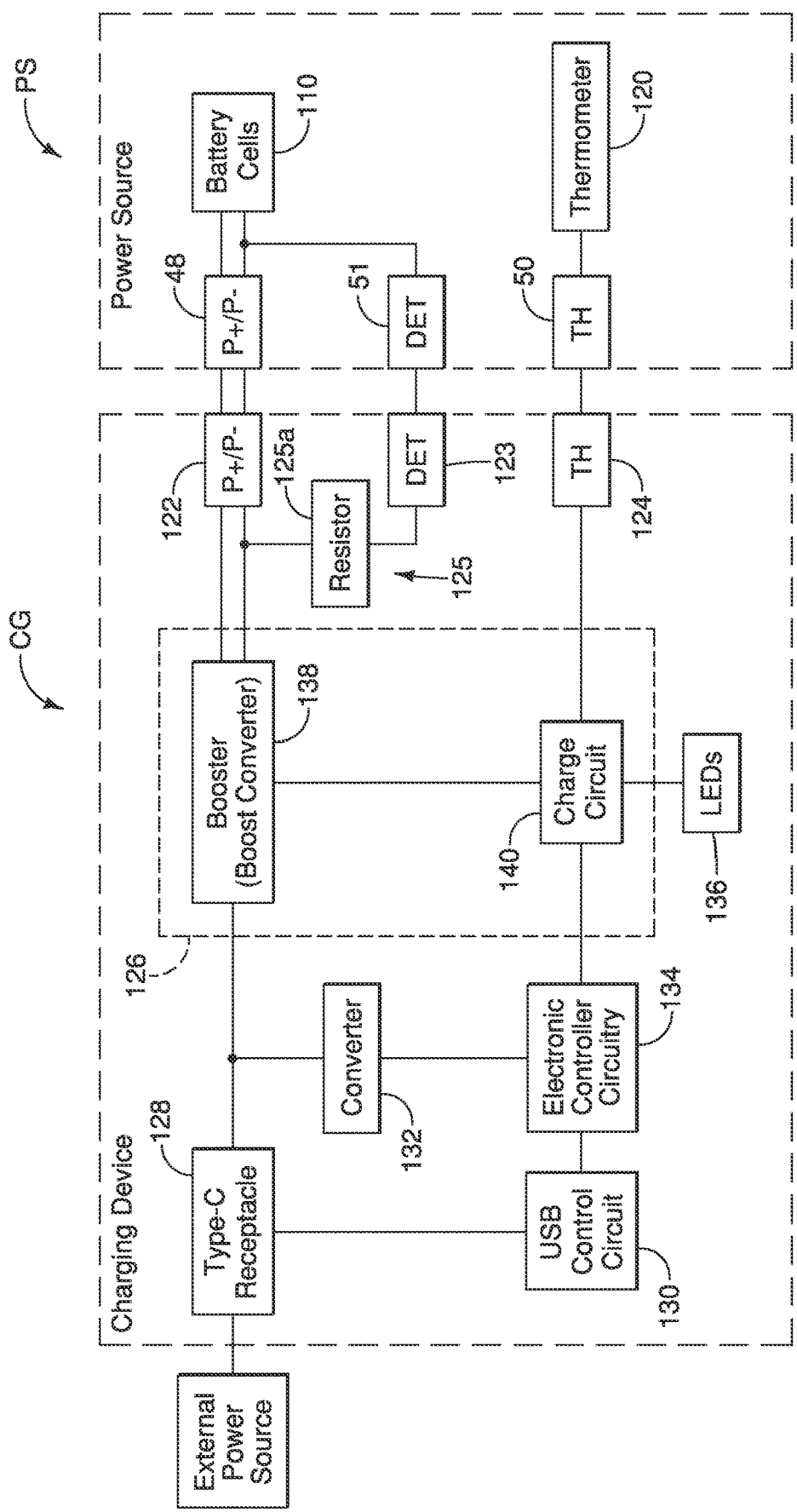
FIG. 25 is a simplified block diagram of the charging device, showing an electrical connection to an external power source and an electrical connection to the power source.

In the illustrated embodiment, as also seen in FIG. 25, the charging device CG further includes a type-C receptacle 128, a USB control circuit 130, a converter 132, an electronic controller circuitry 134, and LEDs 136. These electrical components of the charging device CG can be selected from conventional components, and thus the detailed descriptions of these electrical components will be omitted for the sake of brevity. The Type-C receptacle 128 is a physical connector on the charging device CG into which a USB Type-C cable is pluggable to receive electric power supply from an external power source. Of course, the charging device CG can include any type of connector to receive electric power supply. The USB control circuit 130 establishes the connection between the external power source and the charging device CG, and detects the connection of the USB Type-C cable into the Type-C receptacle 128. The USB control circuit 130 can include one or more ICs. The converter 132 is a component that regulates the voltage of the electric power supply from the external power source to supply a desired voltage to the electronic controller circuitry 134. The converter 132 includes an LDO (Low Dropout), but can be any type of converter, such as a DC/DC converter. The electronic controller circuitry 134 includes an electronic controller, a processor, or a programmable computer that controls and manages various functions of the charging device CG. The electronic controller circuitry 134 monitors the connection between the external power source and the charging device CG and the connection between the power supply PS and the charging device CG and operates the charge controller circuitry 126 to start or stop the charging operation or to control the LEDs 136 for indicating the charging status.

In the illustrated embodiment, the charge controller circuitry 126 includes a booster or boost converter 138 and a charge circuit 140. The booster 138 is a DC/DC converter that is electrically connected between the Type-C receptacle 128 and the power terminals 122. The booster 138 increase the voltage level of the electric power supply from the external power source to a charge voltage level for charging the power source PS. However, the booster 138 can be any type of converter as needed and/or desired. The charge circuit 140 can include one or more ICs. The charge circuit 140 monitors a charge voltage and a charge current of the booster 138 to detect operation status of the charging device CG. The charge circuit 140 is also electrically connected to the monitoring terminal 124 to monitor the resistance of the thermometer 120 of the power source PS for detecting the temperature of the power source PS. While the booster 138 and the charge circuit 140 are separately illustrated, the booster 138 and the charge circuit 140 can be formed as a single chip.

As seen in FIGS. 26 to 28, the charging device CG is configured to receive the power source PS for charging the power source PS. The charging device CG includes an outer casing 142 and an electrical unit 144 that is disposed inside the outer casing 142. The outer casing 142 has a hollow interior 146 that is accessible through an open end 148 of the outer casing 142. The power source PS is placed inside the hollow interior 146 through the open end 148 for charging the power source PS. The outer casing 142 has a main body 150 and an end piece 152 that is fixedly attached to the main body 150 to form a closed end of the outer casing 142. The outer casing 142 also has a closed interior space 156 between the main body 150 and the end piece 152 in a state where the end piece 152 is attached to the main body 150. The electrical unit 144 is disposed inside the closed interior space 156.

The main body 150 has an upper section 150*a*, a lower section 150*b* and an interior wall 150*c*. The upper section 150*a* mainly define the hollow interior 146 therewithin, while the lower section 150*b* mainly define the closed interior space 156 therewithin. The interior wall 150*c* is provided inside the outer casing 142 between the upper section 150*a* and the lower section 150*b* to separate the hollow interior 146 and the closed interior space 156 from each other.

The upper section 150*a* at least partially surrounds the power source housing 52 of the power source PS in a state where the power source PS is attached to the charging device CG. The upper section 150*a* has opposite side walls 158 with side slots 160 such that the power source PS can be held or pinched by user's fingers for removing the power source PS from the charging device CG or placing the power source PS into the charging device CG. Only one of the side walls 158 further has a cut-out or notch 162 that receives the protrusion 54 of the power source PS in a state where the power source PS is attached to the charging device CG. Therefore, when the power source PS is inserted to the upper section 150*a* of the main body 150 in a proper mounting orientation of the power source PS, as shown in FIGS. 26 and 27, the upper section 150*a* does not contact the protrusion 54 and can receive the protrusion 54 within the cut-out 162. On the other hand, when the power source PS is inserted to the upper section 150*a* of the main body 150 in an improper mounting orientation of the power source PS, the upper section 150*a* contacts the protrusion 54 and prevents the power source PS from being installed to the charging device CG. Thus, the charging device CG allows the power source PS to be installed in a single mounting orientation of the power source PS.

The upper section 150*a* further has opposite side walls 164 that extend between the side walls 158 and at least partially define the open end 148 of the outer casing 142. As seen in FIGS. 26 to 28, the side walls 164 have engagement pawls 166 that form snap-fit connections for holding the power source PS in a state where the power source PS is attached to the charging device CG. Specifically, the engagement pawls 166 engages with the power source housing 52 of the power source PS near the bottom surface 52*b* of the power source PS in a state where the power source PS is attached to the charging device CG, and holds the power source PS down toward the interior wall 150*c* to ensure the electrical contacts between the power terminals 48 of the power source PS and the power terminals 122 of the charging device CG, between the second detection terminal 51 of the power source PS and the third detection terminal 123 of the charging device CG, and between the thermal terminal 50 of the power source PS and the monitoring terminal 124 of the charging device CG. In the illustrated embodiment, distal end portions of the engagement pawls 166 can be chamfered for the power source PS to be smoothly received in the charging device CG over the engagement pawls 166. Furthermore, in the illustrated embodiment, a peripheral edge portion of the power source housing 52 of the power source PS near the top surface 52*a* of the power source PS can also be chamfered for the power source PS to be smoothly inserted into the charging device CG over the engagement pawls 166.

As seen in FIG. 28, the electrical unit 144 includes one or more circuit boards or substrates on which the electrical components, such as the power terminals 122, the third detection terminal 123, the monitoring terminal 124, the charge controller circuitry 126, the type-C receptacle 128, the USB control circuit 130, the converter 132, the electronic controller circuitry 134 and the LEDs 136, are disposed. Specifically, in the illustrated embodiment, the electrical unit 144 includes a first substrate 144*a* on which the charge controller circuitry 126, the type-C receptacle 128, the USB control circuit 130, the convertor 132 and the electronic controller circuitry 134 are mounted, a second substrate 144*b* on which the power terminals 122, the third detection terminal 123 and the monitoring terminal 124 are provided, and the third substrate 144*c* on which the LEDs 136 are provided. Of course, the number of the substrates and the mounting of the electrical components thereof are not limited to this, and can be different as needed and/or desired.

As seen in FIG. 28, the end piece 152 of the outer casing 142 has an access opening 152*a* through which the type-C receptacle 128 is accessed to plug the USB Type-C cable therein. In the illustrated embodiment, the interior wall 150*c* has openings through which the power terminals 122, the third detection terminal and the monitoring terminal 124 of the charging device CG are exposed such that the power terminals 122, the third detection terminal 123 and the monitoring terminal 124 of the charging device CG can contact to the power terminals 48, the second detection terminal 51 and the thermal terminal 50 of the power source PS, respectively, in a state where the power source PS is attached to the charging device CG. Furthermore, the lower section 150*b* has windows at locations corresponding to the LEDs 136 that are disposed inside the closed interior space 156 such that lights from the LEDs 136 can be seen from outside the outer casing 142 of the charging device CG.

In the illustrated embodiment, the derailleur 10 is illustrated as an example of a "component" of the present disclosure, and the power source PS is illustrated as being attached to the derailleur 10. However, the component of the present disclosure can be at least one of a rear derailleur, a front derailleur, an internal transmission, an adjustable seatpost, a front suspension, a rear suspension, a brake device and a drive unit. Furthermore, the electrical or mechanical configurations of the derailleur 10, such as the configurations of the power terminals 46 and the first detection terminal 47, the configurations of the bypass circuit 70, etc., can be similarly applied to electric terminals or portions of any components of the bicycle B, such as the rear derailleur, the front derailleur, the internal transmission, the adjustable seatpost, the front suspension, the rear suspension, the brake device, the drive unit, etc. In particular, in the illustrated embodiment, an example is shown in which the derailleur 10 is a rear derailleur and the movable mechanism 13 includes the movable member 14 and the chain guide 16. However, the derailleur 10 is not limited to this, and can be a front derailleur. In this case, a movable mechanism of the front derailleur can include a chain guide, and the electrical or mechanical configurations of the derailleur 10 can be similarly applied to electric terminals of the front derailleur. Furthermore, the electrical or mechanical configurations of the power source PS can be similarly applied to a power source attached to any components of the bicycle B, such as the rear derailleur, the front derailleur, the internal transmission, the adjustable seatpost, the front suspension, the rear suspension, the brake device, the drive unit, etc.

In the illustrated embodiment, an example is shown in which the power source PS is inserted straight into the power source accommodating space 38 along the attachment direction D1 of the power source PS in a state where the power source PS is electrically connected to the component 10. However, the attachment of a power source relative to a component is not limited to this. The power source and the component can be configured such that the power source is attached to an outer surface of the component. In this case, the power source can be held by a holder that is pivotally provided to the outer surface of the component between an open position and a closed position. The power source can be electrically connected to the component in a state where the holder is located at the closed position. Of course, in this case, the electrical or mechanical configurations of the derailleur 10, such as the configurations of the power terminals 46 and the first detection terminal 47, the configurations of the bypass circuit 70, etc., can be similarly applied to electric terminals or portions of this component. Also, the electrical or mechanical configurations of the power source PS can be similarly applied to this power source.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle (e.g., bicycle) in an upright, riding position and equipped with the component. Accordingly, these directional terms, as utilized to describe the component should be interpreted relative to a human-powered vehicle (e.g., bicycle) in an upright riding position on a horizontal surface and that is equipped with the component. The terms "left" and "right" are used to indicate the "right" when referencing from the right side as viewed from the rear of the human-powered vehicle (e.g., bicycle), and the "left" when referencing from the left side as viewed from the rear of the human-powered vehicle (e.g., bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of". For instance, the phrase "at least one of A and B" encompasses (1) A alone, (2) B alone, and (3) both A and B. The phrase "at least one of A, B, and C" encompasses (1) A alone, (2) B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A component for a human-powered vehicle, the component comprising:
   a power source connecting portion configured to be connected to a power source, the power source connecting portion including an attachment surface, a first terminal and a first detection terminal;
   an actuator electrically connected to the power source connecting portion; and
   a first electronic controller circuitry configured to control the actuator with supply current provided from the power source,
   the first terminal being configured to be electrically connected to a power supply terminal of the power source,
   the first terminal being configured to supply the supply current to the actuator in a state where the first detection terminal is configured to be electrically connected to a second detection terminal of the power source, and
   the first detection terminal being configured to contact to the second detection terminal after the first terminal contacts to the power supply terminal during connecting operation of the power source to the power source connecting portion.

2. The component according to claim 1, wherein
   the first detection terminal is configured to be no contact with the second detection terminal with a gap between the first detection terminal and the second detection terminal at a timing when the first terminal contacts to the power supply terminal during connecting operation of the power source to the power source connecting portion.

3. The component according to claim 1, wherein
   the first terminal and the first detection terminal protrudes from the attachment surface,
   the first terminal has a first contact portion,
   the first contact portion is configured to directly contact to the power supply terminal,
   the first detection terminal has a first detection contact portion,
   the first detection contact portion is configured to directly contact to the second detection terminal, and
   the first detection contact portion is closer to the attachment surface than the first contact portion in a disconnection state where the power source is not connected to the power source connecting portion.

4. The component according to claim 3, wherein
   the first terminal has a first length extending from the attachment surface to the first contact portion in the disconnection state, and
   the first detection terminal has a second length extending from the attachment surface to the first detection contact portion, the first length being larger than the second length in the disconnection state.

5. The component according to claim 3, further comprising:
   a power source receiving portion having a power source accommodating space configured to receive the power source in a connection state where the power source is connected to the power source connecting portion, and
   the first contact portion being located closer to an insertion opening of the power source accommodating space than the first detection contact portion in the disconnection state.

6. The component according to claim 1, wherein
   the first terminal and the first detection terminal are spring loaded terminal pins.

7. The component according to claim 1, wherein
the power source connecting portion further includes a substrate, and
the first terminal and the first detection terminal are mounted to the substrate.

8. The component according to claim 1, wherein
the power source connecting portion further includes a bypass circuit provided between the first terminal and the first detection terminal.

9. The component according to claim 8, wherein
the bypass circuit includes a resistor.

10. The component according to claim 1, further comprising
the power source including a second electronic controller circuitry configured to control the supply current in response to contact between the first detection terminal and the second detection terminal.

11. The component according to claim 10, wherein
the power supply terminal has a power contact portion,
the second detection terminal has a second detection contact portion, and
the power contact portion and the second detection contact portion are located on a first plane in an attachment direction of the power source for connecting the power supply terminal to the first terminal and the second detection terminal to the first detection terminal.

12. The component according to claim 1, wherein
the power source connecting portion further includes a cable receiving passageway for receiving an electrical cable connecting the first terminal to the actuator.

13. The component according to claim 12, further comprising
a cable holder configured to hold a portion of the electrical cable connecting the first terminal to the actuator.

14. The component according to claim 1, wherein
the power source connecting portion further includes a second terminal.

15. The component according to claim 14, wherein
the second terminal is a spring loaded terminal pin.

16. The component according to claim 1, further comprising:
a base member;
a movable mechanism; and
a link member movably coupling the movable mechanism to the base member,
the power source connecting portion being attached to the link member, and
the actuator being provided to one of the base member and the movable mechanism.

17. The component according to claim 16, wherein
the component is a derailleur.

18. The component according to claim 16, wherein
the link member includes an inner link and an outer link, and
the power source connecting portion is attached to the outer link.

19. A component for a human-powered vehicle, the component comprising:
a power source connecting portion configured to be connected to a power source, the power source connecting portion including an attachment surface, a first terminal and a first detection terminal;
an actuator electrically connected to the power source connecting portion; and
a first electronic controller circuitry configured to control the actuator with supply current provided from the power source,
the first terminal being configured to be electrically connected to a power supply terminal of the power source,
the first terminal being configured to supply the supply current to the actuator in a state where the first detection terminal is configured to be electrically connected to a second detection terminal of the power source, and
the first detection terminal being configured to be no contact with the second detection terminal with a gap being provided between the first detection terminal and the second detection terminal at a timing when the first terminal contacts to the power supply terminal during connecting operation of the power source to the power source connecting portion.

20. A component for a human-powered vehicle, the component comprising:
a power source connecting portion configured to be connected to a power source, the power source connecting portion including an attachment surface, a first terminal and a first detection terminal, the first terminal and the first detection terminal protruding from the attachment surface;
an actuator electrically connected to the power source connecting portion; and
a first electronic controller circuitry configured to control the actuator with supply current provided from the power source,
the first terminal being configured to be electrically connected to a power supply terminal of the power source,
the first terminal being configured to supply the supply current to the actuator in a state where the first detection terminal is configured to be electrically connected to a second detection terminal of the power source,
the first terminal having a first contact portion, the first contact portion being configured to directly contact to the power supply terminal, and
the first detection terminal having a first detection contact portion, the first detection contact portion being configured to directly contact to the second detection terminal, the first detection contact portion being closer to the attachment surface than the first contact portion in a disconnection state where the power source is not connected to the power source connecting portion.

* * * * *